United States Patent
Flider et al.

(10) Patent No.: US 12,354,201 B2
(45) Date of Patent: Jul. 8, 2025

(54) DYNAMIC GRAPHICAL RENDERING SYSTEMS AND METHODS

(71) Applicant: Apple Inc., Cupertino, CA (US)

(72) Inventors: Mark J Flider, Mountain View, CA (US); Sara M Sweer, San Francisco, CA (US); Andrew L Harding, Portola Valley, CA (US); Syed R Ali, Marina Del Rey, CA (US)

(73) Assignee: Apple Inc., Cupertino, CA (US)

( * ) Notice: Subject to any disclaimer, the term of this patent is extended or adjusted under 35 U.S.C. 154(b) by 118 days.

(21) Appl. No.: 17/948,800

(22) Filed: Sep. 20, 2022

(65) Prior Publication Data

US 2023/0394736 A1     Dec. 7, 2023

Related U.S. Application Data

(60) Provisional application No. 63/349,120, filed on Jun. 5, 2022.

(51) Int. Cl.
*G06T 13/80* (2011.01)
(52) U.S. Cl.
CPC .................................. *G06T 13/80* (2013.01)
(58) Field of Classification Search
None
See application file for complete search history.

(56) References Cited

U.S. PATENT DOCUMENTS

| | | | |
|---|---|---|---|
| 2006/0055700 A1* | 3/2006 | Niles | G06T 13/20 345/473 |
| 2007/0132779 A1* | 6/2007 | Gilbert | G06F 8/38 345/619 |
| 2012/0069051 A1* | 3/2012 | Hagbi | G06T 19/006 345/633 |
| 2013/0275525 A1* | 10/2013 | Molina | H04L 51/234 709/206 |
| 2015/0106722 A1* | 4/2015 | Ubillos | G06F 3/0488 715/731 |
| 2016/0267700 A1* | 9/2016 | Huang | G06F 3/04842 |
| 2017/0140505 A1* | 5/2017 | Gueniot | G06T 13/80 |
| 2018/0300938 A1* | 10/2018 | Schreiber | G06T 15/04 |
| 2019/0228589 A1* | 7/2019 | Dascola | G06T 7/70 |

* cited by examiner

Primary Examiner — Steven Z Elbinger
(74) Attorney, Agent, or Firm — FLETCHER YODER PC

(57) ABSTRACT

A software application may include a dynamic motion rendering engine that uses a geometric function and parameters to dynamically generate, during runtime, dynamic motion animations that may be used in backgrounds and/or object fills within the software application. The dynamic motion animations are constantly and perpetually changing animations that can be dynamically modified on the fly, creating added versatility and efficient processing to the software application.

20 Claims, 26 Drawing Sheets
(16 of 26 Drawing Sheet(s) Filed in Color)

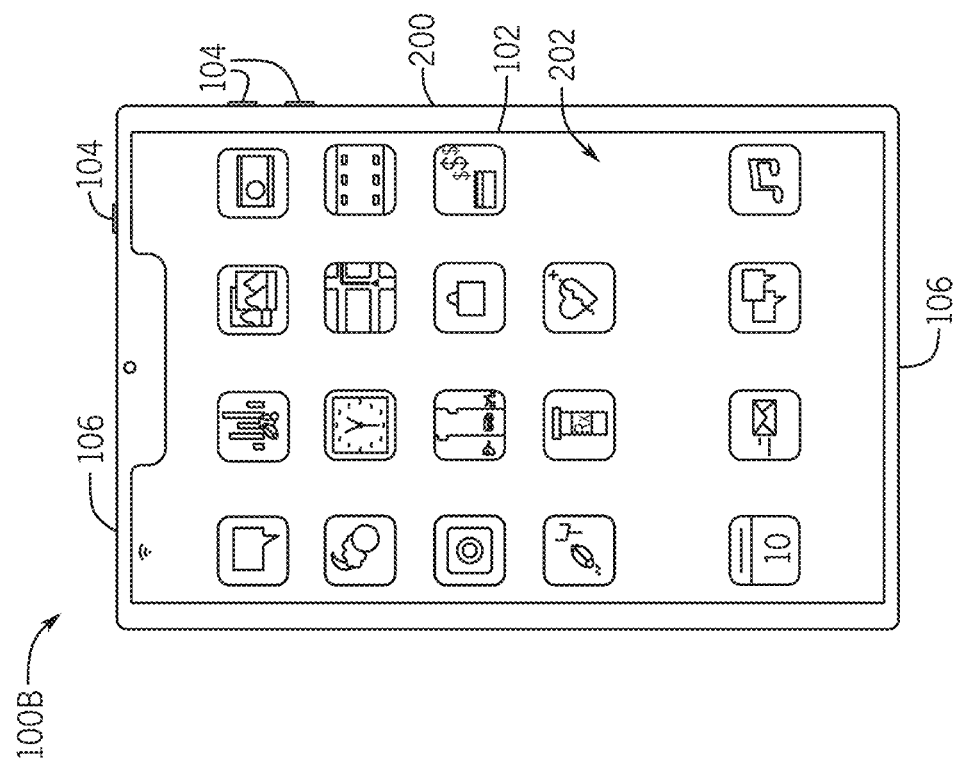
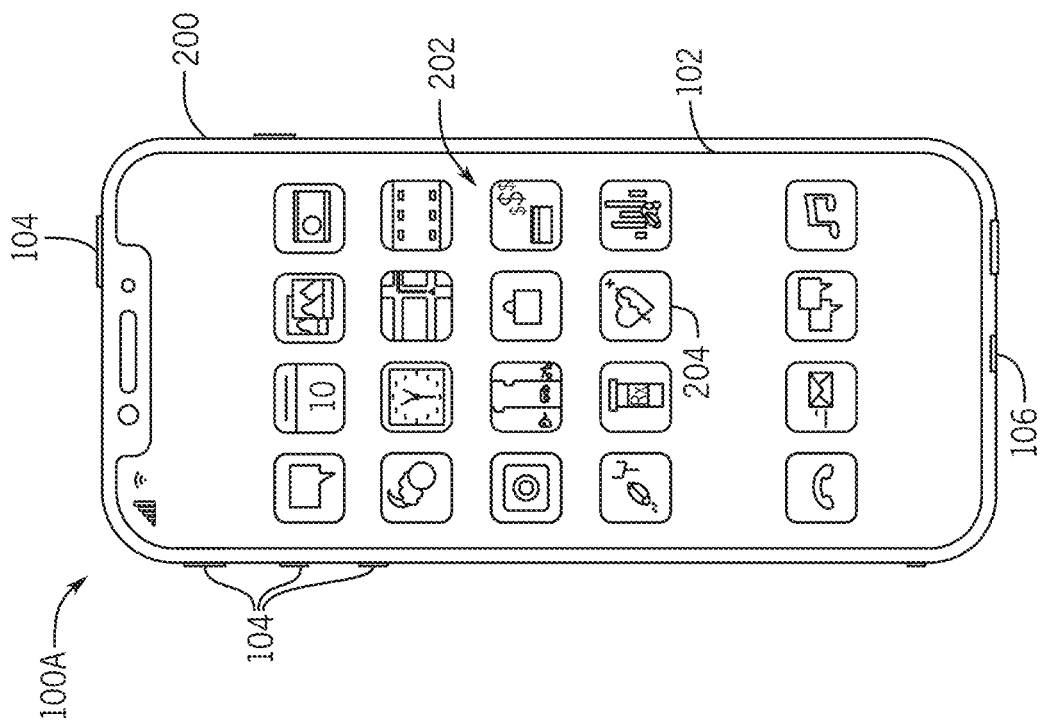

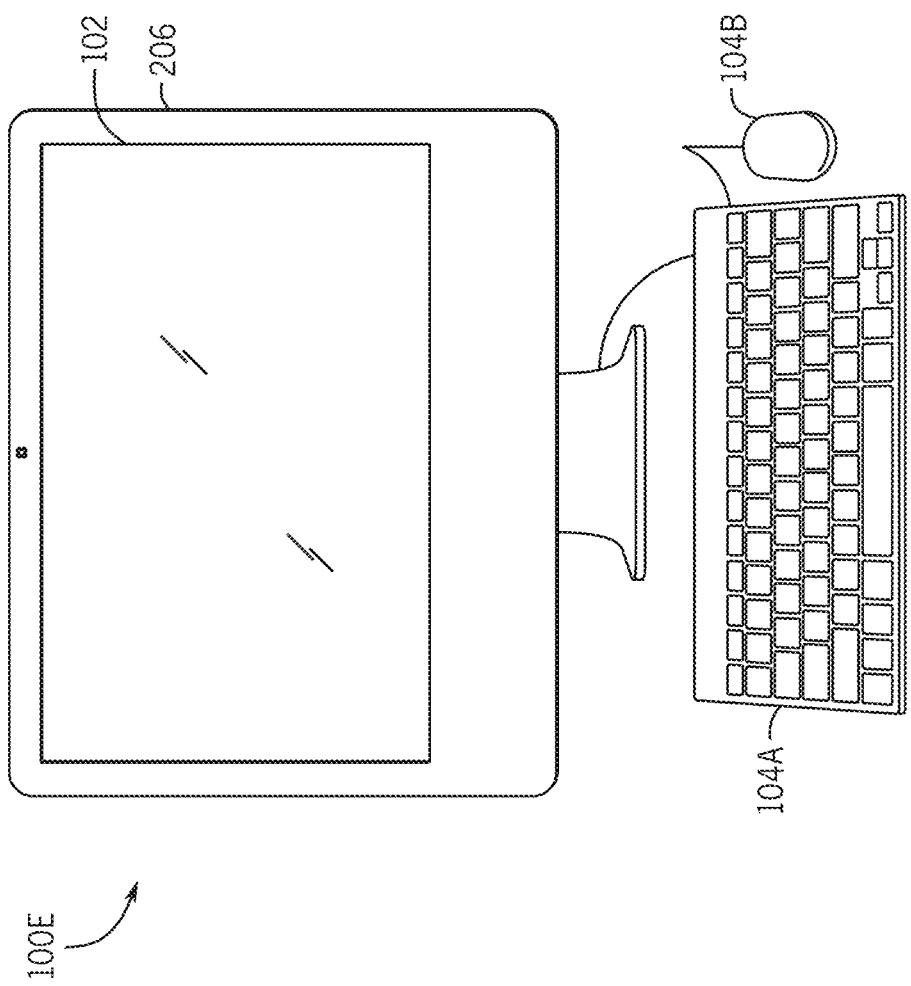

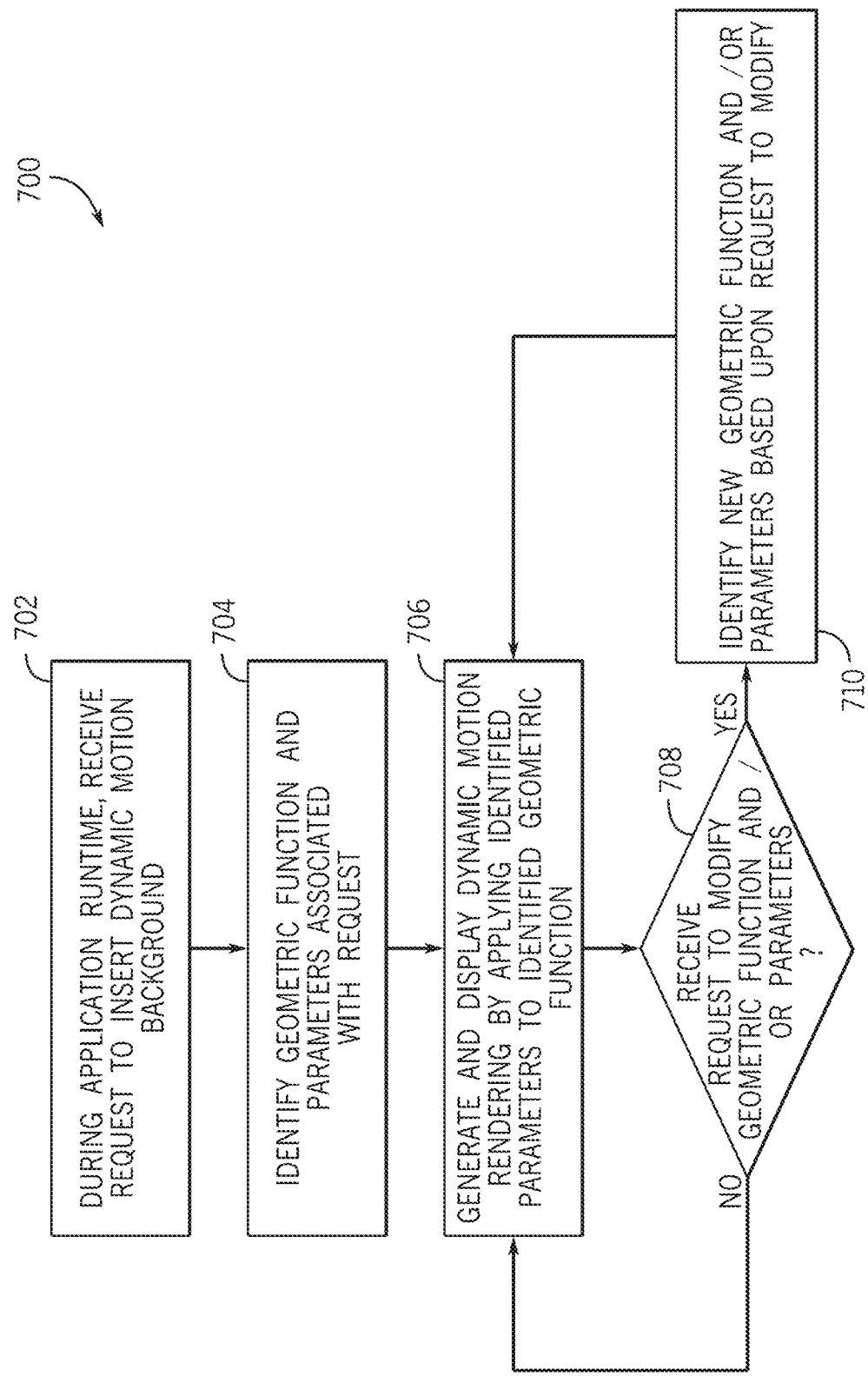

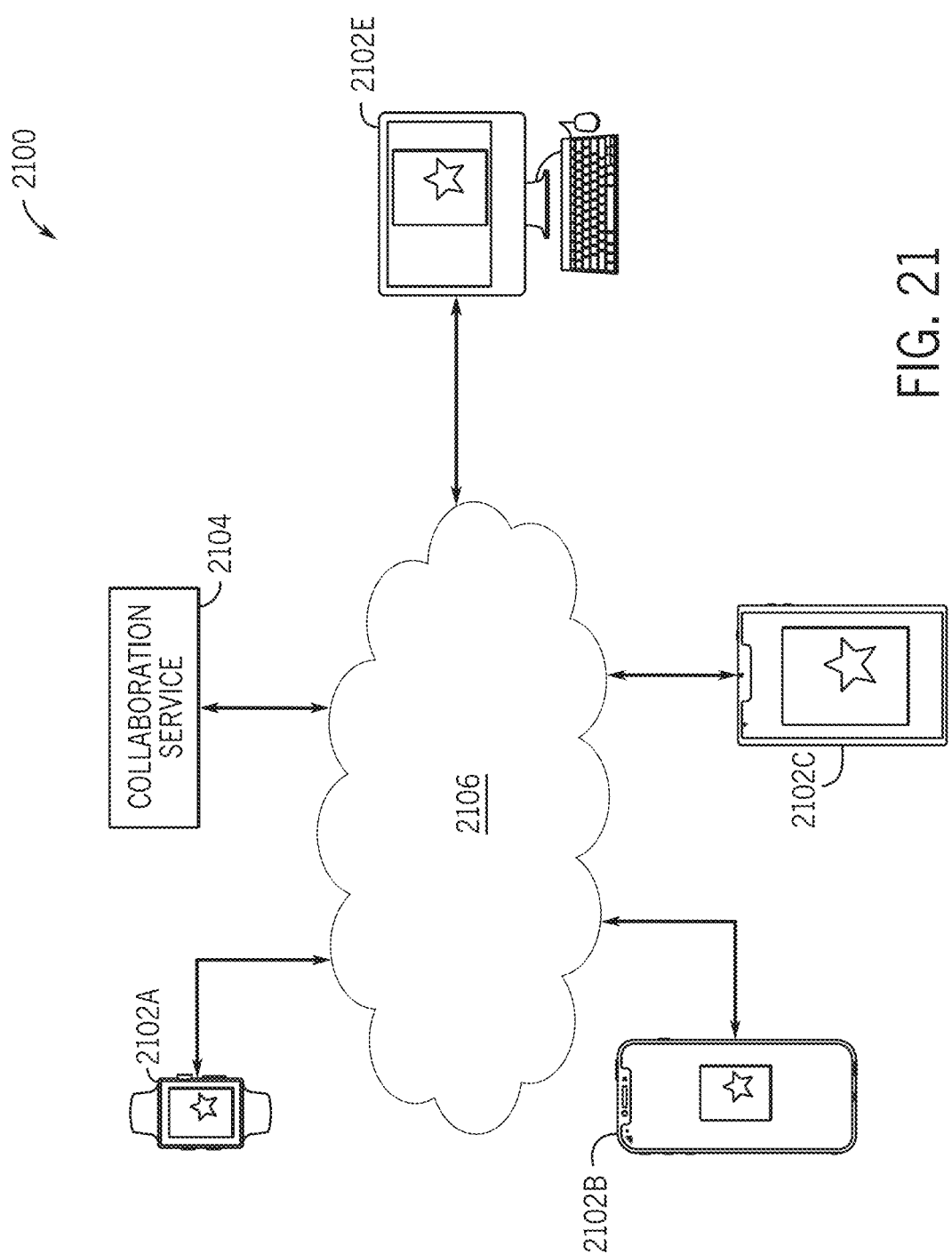

DYNAMIC GRAPHICAL RENDERING SYSTEMS AND METHODS

CROSS-REFERENCE TO RELATED APPLICATIONS

This application claims the benefit of U.S. Provisional Application No. 63/349,120, filed Jun. 5, 2022, entitled "Dynamic Graphical Rendering Systems and Methods," which is hereby incorporated by reference in its entirety for all purposes.

SUMMARY

The present disclosure relates generally to techniques for dynamic rendering of motion, and more particularly, to efficiently generating and presenting dynamic motion across a number of different scenarios.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Productivity software, such as slide presentation software (e.g., Keynote® from Apple Inc.) may make use of animations (e.g., in the form of movie clips) to provide rich content in presentations and other documents. Unfortunately, however, when movie clips are incorporated into content, because movie clips are generated prior to use in the productivity software, the movie clip content is typically static, providing a lack of flexibility in user modification at runtime. Further, the movie clip content oftentimes is a large file size, causing excessive storage space requirements for storing the movie clip content and/or the resulting productivity software content that uses the movie clip content. Additionally, typical movie clip content is looped to provide a desired amount of content for a desired time period, which may result in repetitive movie content presented to a user. As productivity software content transitions (e.g., slide to slide transition in a slide presentation), these movie clips are typically restarted, causing perceived breaks and restarts of movie clips as a transition is presented.

Accordingly, systems and techniques are described herein to provide dynamic generation and presentation of motions within productivity software. For example, dynamic motion may be generated and presented as background motion animations of productivity software content and/or graphical "fills" for content objects (e.g., shapes, text boxes, etc.) of a productivity software application. Further, these dynamic motions may be adjusted based upon rendering characteristics associated with a particular dynamic motion rendering. For example, productivity software application users may set particular parameters regarding the dynamic motion that may result in customized dynamic motion. Further, certain processing parameters (e.g., processing capabilities, monitored processing system characteristics, etc.) may be used to dynamically scale a granularity/complexity of a dynamic motion. Additionally, particular output characteristics (e.g., outputting via a video conferencing platform and/or a particular type of projector) may result in modifications that provide an enhanced dynamic motion associated with the particular output characteristics. In collaborative scenarios where one or more rendering-incapable client machines are unable to render a particular dynamic motion, a rendering-capable client may facilitate rendering of one or more frames of the dynamic motion to these rendering-incapable client machines, enabling these rendering-incapable client machines to present at least a representation of the dynamic motion, despite being incapable of rendering the dynamic motion.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects of this disclosure may be better understood upon reading the following detailed description and upon reference to the drawings described below.

FIG. 2 is an example of the electronic device of FIG. 1, in accordance with an embodiment;

FIG. 3 is another example of the electronic device of FIG. 1, in accordance with an embodiment;

FIG. 6 is another example of the electronic device of FIG. 1, in accordance with an embodiment;

FIG. 7 is a flowchart, illustrating a process for implementing a dynamic motion in a background of productivity software content, in accordance with an embodiment;

FIG. 21 illustrates a collaborative environment where supportive rendering of content is facilitated, in accordance with an embodiment.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
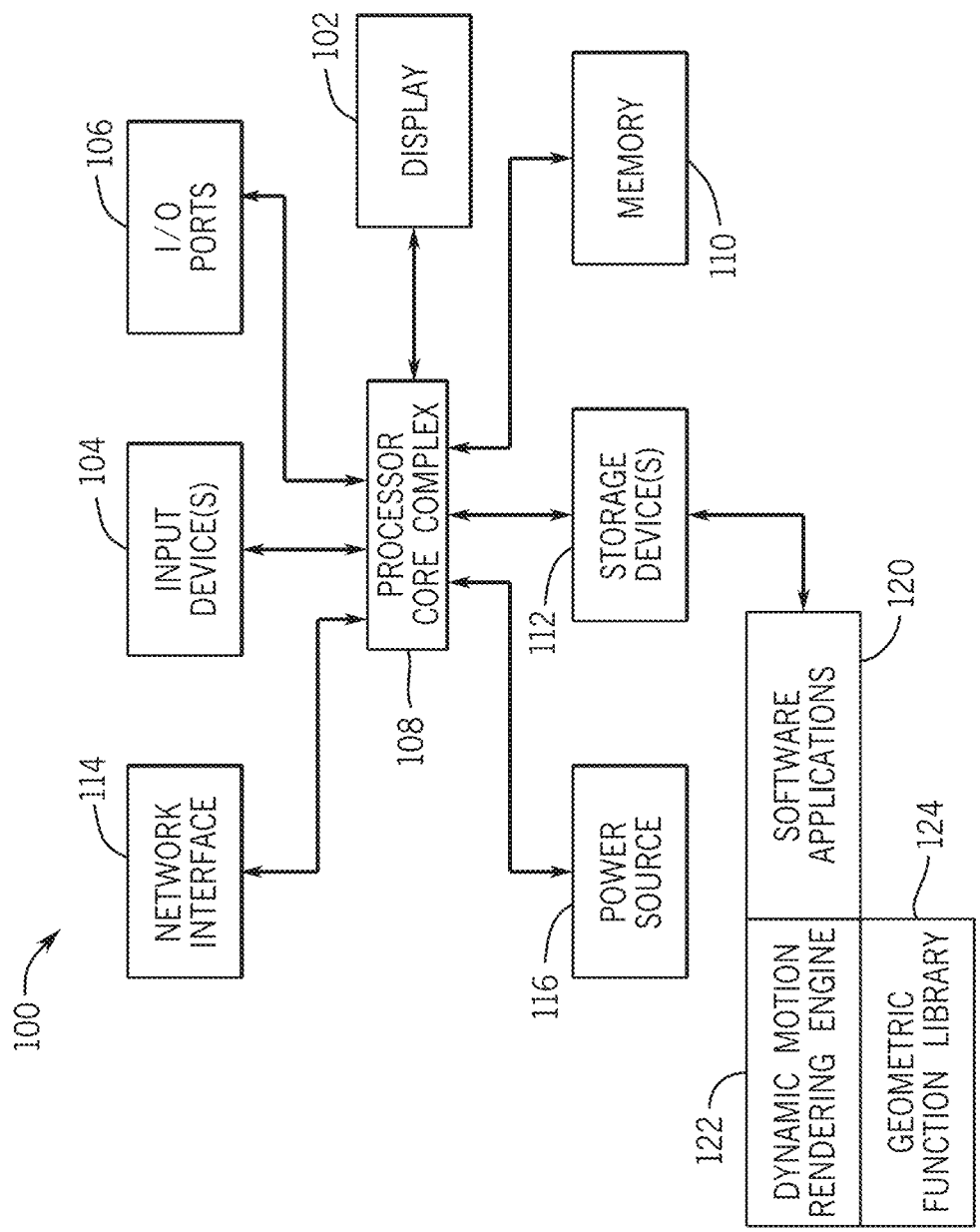
FIG. 1 is a block diagram of an electronic device with an electronic display, in accordance with an embodiment.

With the preceding in mind and to help illustrate, an electronic device 100 including an electronic display 102 is shown in FIG. 1. As is described in more detail below, the electronic device 100 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 100.

The electronic device 100 includes the electronic display 102, one or more input devices 104, one or more input/output (I/O) ports 106, a processor core complex 108 having one or more processing circuitry(s) or processing circuitry cores, local memory 110, a main memory storage device 112, a network interface 114, and a power source 116 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 110 and the main memory storage device 112 may be included in a single component.

The processor core complex 108 is operably coupled with local memory 110 and the main memory storage device 112. Thus, the processor core complex 108 may execute instructions stored in local memory 110 or the main memory storage device 112 to perform operations, such as generating or transmitting image data to display on the electronic display 102. As such, the processor core complex 108 may include one or more general purpose microprocessors, one or more application specific integrated circuits (ASICs), one or more field programmable logic arrays (FPGAs), or any combination thereof.

In addition to program instructions, the local memory 110 or the main memory storage device 112 may store data to be processed by the processor core complex 108. Thus, the local memory 110 and/or the main memory storage device 112 may include one or more tangible, non-transitory, computer-readable media. For example, the local memory 110 may include random access memory (RAM) and the main memory storage device 112 may include read-only memory (ROM), rewritable non-volatile memory such as flash memory, hard drives, optical discs, or the like.

As illustrated, the storage device(s) 112 may store a software application 120 (e.g., a productivity software application, such as a word processing application, such as Pages® by Apple Inc.; a spreadsheet application, such as Numbers® by Apple Inc., a presentation application, such as Keynote® by Apple Inc.; etc.). As will be described in more detail herein, the software application 120 may include an onboard dynamic motion rendering engine 122 that may generate seemingly perpetual dynamic motion animations that provide moving shapes/patterns within the software application. For example, these dynamic motion animations may be applied as backgrounds to content generated by the software application (e.g., as a background to one or more slides of a presentation application) and/or applied as a dynamic fill for content objects generated in the software application (e.g., a moving fill pattern within the bounds of an object inserted into a slide of a presentation application). To dynamically generate the motion animations, the dynamic motion rendering engine may make use of an onboard and/or remote geometric function library 124. The geometric function library 124 may include parameterized geometric functions that, when executed create motion animations based upon parameters supplied to the parameterized geometric functions. These generated motion animations may be returned from the dynamic motion rendering engine 122 to the software application 120, where objects/parameters of the software application 120's content (e.g., a background parameter and/or object and/or a fill parameter of a particular object) may be assigned the values of the dynamic motion. In this manner, the software application may dynamically generate and present motion animations assigned to particular portions of content that the software application generates, such as background portions and/or fill portions of particular specified objects within the content.

The dynamic motion rendering engine 122 may generate dynamic motion animations with unique aspects that are continuously generated during runtime, resulting in constantly changing animations. This may provide many benefits. For one, a perpetual animation may be supplied without relying on pre-existing content, which is oftentimes looped and/or utilizes a significant amount of storage resources. In contrast, because the dynamic motion rendering engine 122 generates the dynamic motion animations during runtime, without the use of pre-existing content, significant storage reduction may be achieved. Further, rather than looping pre-existing content, the dynamic motion rendering engine 122 may continuously generate new animation frames during runtime, resulting in a more unique experience that does not rely on repeated (e.g., looped) content. In this manner, the content may appear fluid and unique, regardless of an amount of time the dynamic motion animation is displayed. Indeed, the shapes and animations generated by the dynamic motion rendering engine 122 may be unique to each client, providing different shapes and animations depending on aspects of the playback and/or of the client that is generating the dynamic motion animation. Further, because the dynamic motion animations are not serialized (e.g., having a fixed start and end), the dynamic motion animations may provide a smoother integration within the productivity software applications. For example, in a slide presentation software application, when movies are presented from slide to slide, the movies typically re-start at the transition to the next slide. This may cause a jarring effect, where a clear break in the movie content is observed during the slide transition. In contrast, the dynamic motion animation may include fluid content without a definitive start and end point, which may enable smooth and blended transitions across slides.

The network interface 114 may communicate data with another electronic device or a network. For example, the network interface 114 (e.g., a radio frequency system) may enable the electronic device 100 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 116 may provide electrical power to one or more components in the electronic device 100, such as the processor core complex 108 or the electronic display 102. Thus, the power source 116 may include any suitable source of energy, such as a rechargeable lithium polymer (Li-poly) battery or an alternating current (AC) power converter. The I/O ports 106 may enable the electronic device 100 to interface with other electronic devices. For example, when a portable storage device is connected, the I/O port 106 may enable the processor core complex 108 to communicate data with the portable storage device.

The input devices 104 may enable user interaction with the electronic device 100, for example, by receiving user inputs via a button, a keyboard, a mouse, a trackpad, a touch sensing, or the like. The input device 104 may include touch-sensing components (e.g., touch control circuitry, touch sensing circuitry) in the electronic display 102. The touch sensing components may receive user inputs by detecting occurrence or position of an object touching the surface of the electronic display 102.

In addition to enabling user inputs, the electronic display 102 may be a display panel with one or more display pixels. For example, the electronic display 102 may include a self-emissive pixel array having an array of one or more of self-emissive pixels. The electronic display 102 may include any suitable circuitry (e.g., display driver circuitry) to drive the self-emissive pixels, including for example row driver and/or column drivers (e.g., display drivers). Each of the self-emissive pixels may include any suitable light emitting element, such as a LED or a micro-LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used. The electronic display 102 may control light emission from the display pixels to present visual representations of information, such as a graphical user interface (GUI) of an operating system, an application interface, a still image, or video content, by displaying frames of image data. To display images, the electronic display 102 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 102 may display an image by controlling pulse emission (e.g., light emission) from its display pixels based on pixel or image data associated with corresponding image pixels (e.g., points) in the image. In some embodiments, pixel or image data may be generated by an image source (e.g., image data, digital code), such as the processor core complex 108, a graphics processing unit (GPU), or an image sensor. In this manner, the dynamic motions generated by the software application 120 may be displayed via the display 102. Additionally, in some embodiments, image data may be received from another electronic device 100, for example, via the network interface 114 and/or an I/O port 106. Accordingly, motion animations and/or representations of motion animations provided from other electronic devices may be displayed via the display 102. Similarly, the electronic display 102 may display an image frame of content based on pixel or image data generated by the processor core complex 108, or the electronic display 102 may display frames based on pixel or image data received via the network interface 114, an input device, or an I/O port 106.

The electronic device 100 may be any suitable electronic device. To help illustrate, an example of the electronic device 100, a handheld device 100A, is shown in FIG. 2. The handheld device 100A may be a portable phone, a media player, a personal data organizer, a handheld game platform, or the like. For illustrative purposes, the handheld device 100A may be a smart phone, such as any IPHONE® model available from Apple Inc.

The handheld device 100A includes an enclosure 200 (e.g., housing). The enclosure 200 may protect interior components from physical damage or shield them from electromagnetic interference, such as by surrounding the electronic display 102. The electronic display 102 may display a graphical user interface (GUI) 202 having an array of icons. When an icon 204 is selected either by an input device 104 or a touch-sensing component of the electronic display 102, an application program may launch.

The input devices 104 may be accessed through openings in the enclosure 200. The input devices 104 may enable a user to interact with the handheld device 100A. For example, the input devices 104 may enable the user to activate or deactivate the handheld device 100A, navigate a user interface to a home screen, navigate a user interface to a user-configurable application screen, activate a voice-recognition feature, provide volume control, or toggle between vibrate and ring modes.

Figure 4:
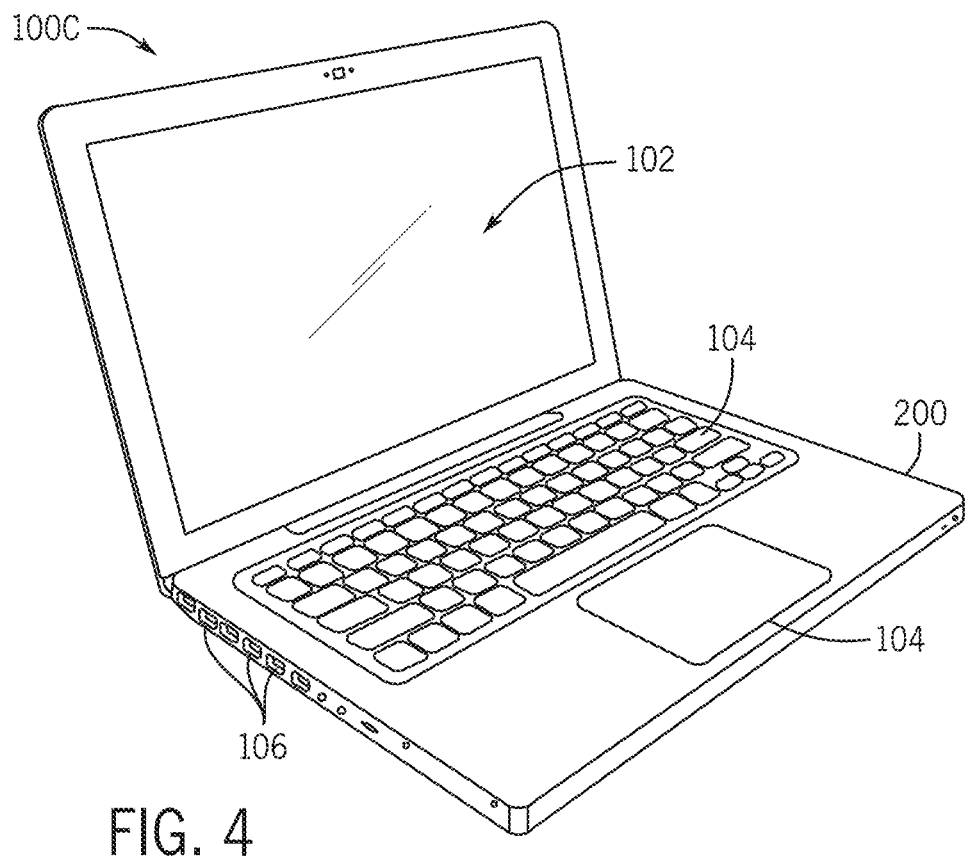
FIG. 4 is another example of the electronic device of FIG. 1, in accordance with an embodiment.
Figure 5:
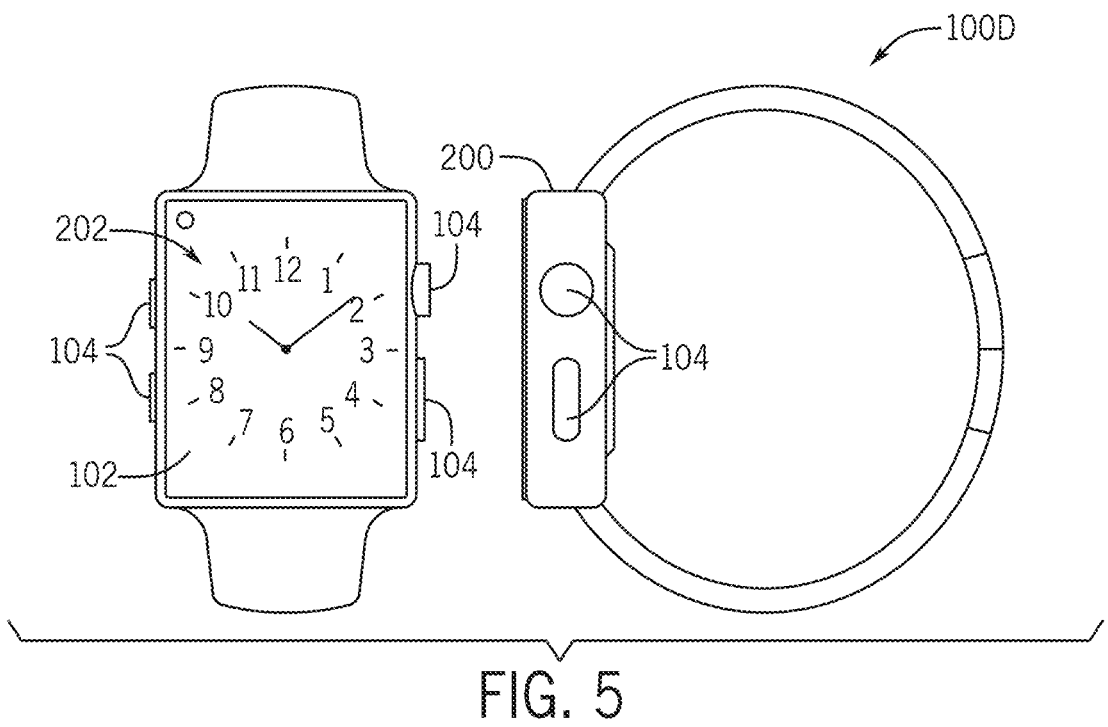
FIG. 5 is another example of the electronic device of FIG. 1, in accordance with an embodiment.

Another example of a suitable electronic device 100, specifically a tablet device 100B, is shown in FIG. 3. The tablet device 100B may be any IPAD® model available from Apple Inc. A further example of a suitable electronic device 100, specifically a computer 100C, is shown in FIG. 4. For illustrative purposes, the computer 100C may be any MAC-BOOK® or IMAC® model available from Apple Inc. Another example of a suitable electronic device 100, specifically a watch 100D, is shown in FIG. 5. For illustrative purposes, the watch 100D may be any APPLE WATCH® model available from Apple Inc. As depicted, the tablet device 100B, the computer 100C, and the watch 100D each also includes an electronic display 102, input devices 104, I/O ports 106, and an enclosure 200. The electronic display 102 may display a GUI 202. Here, the GUI 202 shows a visualization of a clock. When the visualization is selected either by the input device 104 or a touch-sensing component of the electronic display 102, an application program may launch, such as to transition the GUI 202 to presenting the icons 204 discussed in FIGS. 2 and 3.

Turning to FIG. 6, a computer 100E may represent another embodiment of the electronic device 100 of FIG. 1. The computer 100E may be any computer, such as a desktop computer, a server, or a notebook computer, but may also be a standalone media player or video gaming machine. By way of example, the computer 100E may be an iMac®, a MacBook®, or other similar device by Apple Inc. of Cupertino, California. It should be noted that the computer 100E may also represent a personal computer (PC) by another manufacturer. A similar enclosure 206 may be provided to protect and enclose internal components of the computer 100E, such as the electronic display 102. In certain embodiments, a user of the computer 100E may interact with the computer 100E using various peripheral input structures 104, such as the keyboard 104A or mouse 104B, which may connect to the computer 100E.

Figure 8A:
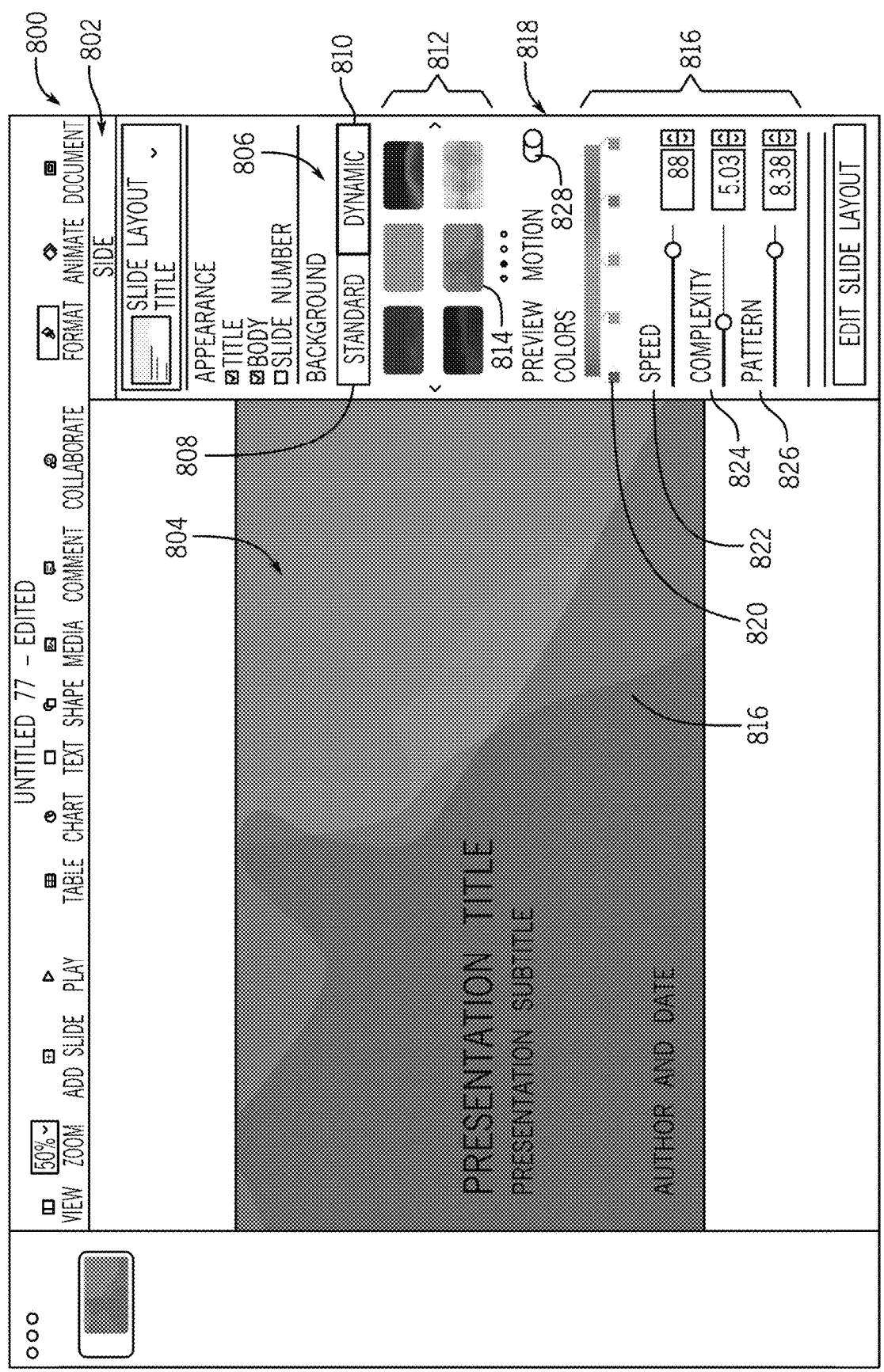
FIGS. 8A and 8B illustrate a dynamic motion rendered as a background within content of a presentation software application, in accordance with an embodiment.
Figure 8B:
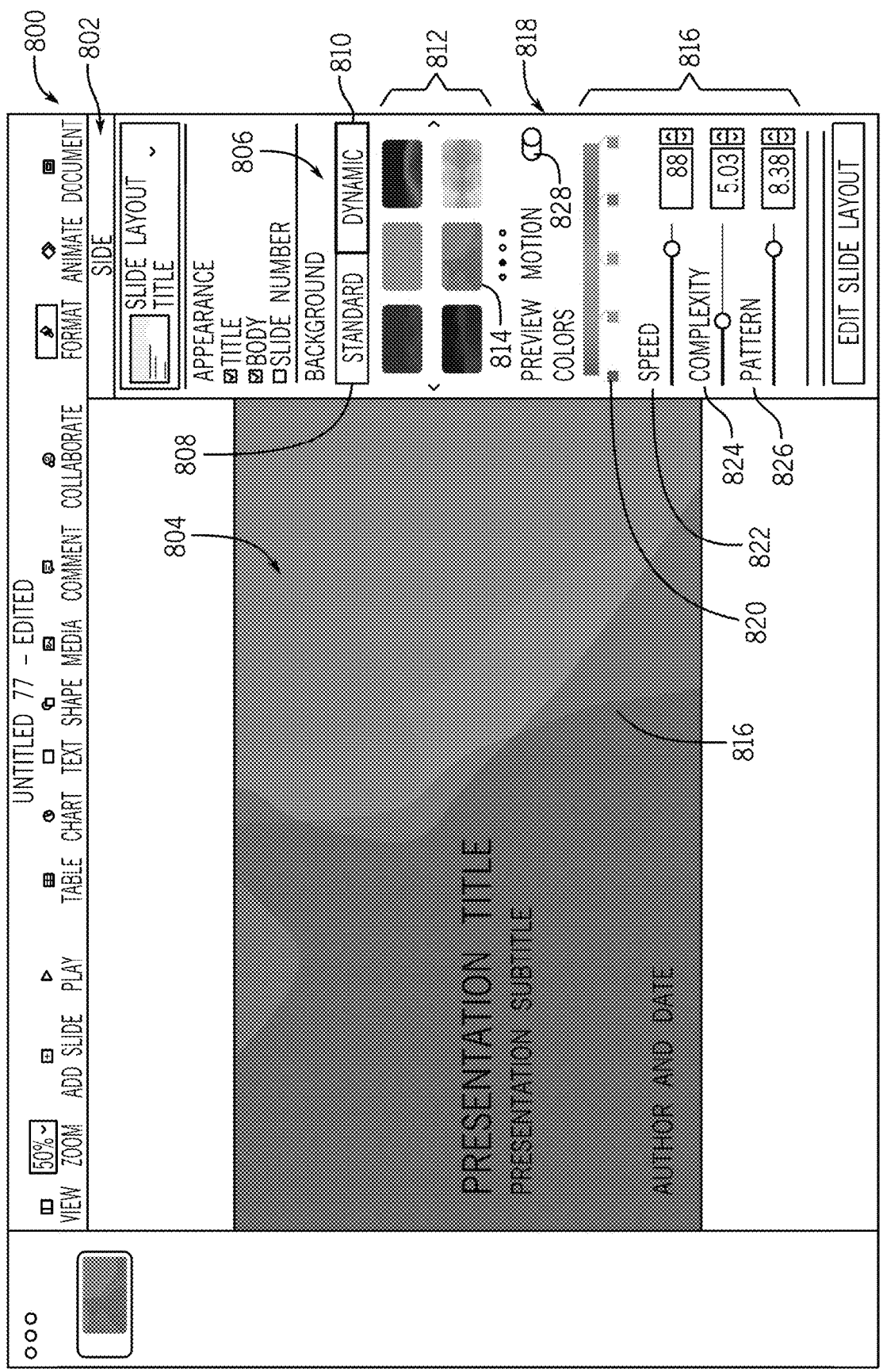

As mentioned above, software applications (e.g., productivity software applications) of an electronic device may be equipped with a dynamic motion rendering engine that may generation one or more dynamic motions for presentation within content. FIG. 7 is a flowchart, illustrating a process 700 for implementing a dynamic motion in a background of software content, in accordance with an embodiment. FIGS. 8A and 8B illustrate a progression of a dynamic motion rendered as a background within content of a presentation software application graphical user interface (GUI) 800, in accordance with an embodiment. For simplicity, these figures will be discussed together.

The process 700 begins by receiving, during application runtime, a request to insert a dynamic motion background in the application's content (block 702). For example, this request may occur during edit mode and/or presentation mode of a presentation software application. FIG. 8A illustrates a GUI 800 that is an edit mode GUI for editing aspects of a slide in a slide presentation application. The GUI 800 includes a slide formatting menu 802 (e.g., here in the form of a sidebar slide out) that enables a user to edit features/formatting of a slide (e.g., slide 804). The slide formatting menu 802 includes a background formatting section 806 that enables a user to request a dynamic background. For example, in FIG. 8A, the user may select from a standard background, which might include a static image, movie clip, color fill, etc., by selecting affordance 808 and corresponding desired options from a list of options associated with affordance 808. When a dynamic background is desired, the user may request this by selecting affordance 810, which results in display of associated dynamic motion background options. For example, to provide the request, the user may select a particular motion animation from a motion animation list 812. The motion animation list 812 may include a set default motion animation options that may be used. These default motion animation options may be associated with a corresponding geometric function and parameters that create a specified default motion animation. For example, the motion animation list 812 may include default motion animations that utilize different geometric functions (e.g., a waveform producing geometric function vs. a gradient producing geometric function) and/or default motion animations that utilize different parameters to produce different motion animations (e.g., different colors, different numbers of colors, different complexities, different speeds, etc.). Here, a request for dynamic motion background is received in response to the user selecting affordance 814, which is one of the default motion animation selections of the motion animation list 812.

Returning to FIG. 7, a geometric function and/or parameters associated with the request are identified (block 704). For example, the affordance 814 is associated with a particular geometric function (e.g., a blob-producing geometric function) and a set of default parameters/parameter values 816. These default parameters (or a subset of the parameters)/parameter values 816 may be presented within the GUI 800. For example, the software application may specify a particular subset of parameters that may be controlled by the user based upon selection of affordance 814 and display these default parameters with the parameter values associated with affordance 814 in a dynamic motion control section 818. For example, here, affordance 814 is associated with five green shades, as illustrated by the color nodes 820. If desired, any one of these color nodes may be selected and the preset color may be adjusted, which will cause a dynamic adjustment to dynamic motion animation (e.g., by applying a new parameter to the identified geometric function). Further, a speed parameter 822 is set to 88 (e.g., in a range of 1-100), a complexity parameter 824 is set to 5.03 (e.g., in a range of 1-10), and a pattern parameter 826 is set to 8.38 (e.g., in a range of 1-10). The speed parameter 822 determines how fast each generated shape will move. The complexity parameter 824 determines how complex the generated shapes will be (e.g., how many curvatures will be generated). The pattern parameter 826 may determine patterns for the generated shapes (e.g., whether horizontal or vertical blobs are generated). These parameter value associations and the blob-providing geometric function association with affordance 814 provide the geometric function and parameters that will be used in the background motion animation generated and displayed based upon selecting affordance 814.

The dynamic motion may be generated and displayed as a background (block 706). For example, the identified parameters may be applied to the identified geometric function to generate, via the dynamic motion rendering engine embedded in the application, the dynamic motion rendering. This dynamic motion rendering may be applied to a parameter and/or object within the software application (e.g., a background parameter and/or object) to cause the motion animation to be applied to/display as the background.

The user may request that modifications be made to the motion animation. For example, the user may request a different selection from the motion animation list 812 and/or may request a change from one of the default parameters/parameter values 816 displayed in motion control section 818. At decision block 708, a determination is made as to whether a request to modify the geometric function and/or parameters has been received. If not, the dynamic motion continues to be rendered and displayed (block 706) until a request/trigger to change and/or halt the motion animation is received. For example, in edit mode, an affordance 828 may indicate whether a preview of the dynamic motion should be presented. When de-selected, the affordance 828 may cause the dynamic motion animation to pause at a particular spot. As illustrated in FIG. 8B, the dynamic motion animation results in changes to the shapes rendered in the background in successive slides. The motion may be fluid and appear to be smooth motion changing over time, as the slide remains presented. As will be discussed in more detail below, even upon a slide transition, the dynamic motion animation may be retained and presented, causing a seamless presentation of the motion animation, when successive slides include the same dynamic motion animation (e.g., same geometric function and selected parameter values).

If however, a request to modify the geometric function and/or parameter values is received at decision block 708, the new geometric function and/or parameters/parameter values associated with the request are identified (block 710) and the new motion animation is generated and displayed at block 706 until a request/trigger to change and/or halt the motion animation is received.

Having discussed how the dynamic motion animations are generated and displayed, the discussion now turns to particular geometric functions and parameters that may be provided by the software application for use in dynamic motion generation. The following examples are not exhaustive. Indeed, a number of additional geometric functions and/or dynamic motion animation could be utilized using the techniques described herein. The disclosure of the current examples is not intended to limit the current techniques to the disclosed examples.

Figure 9A:
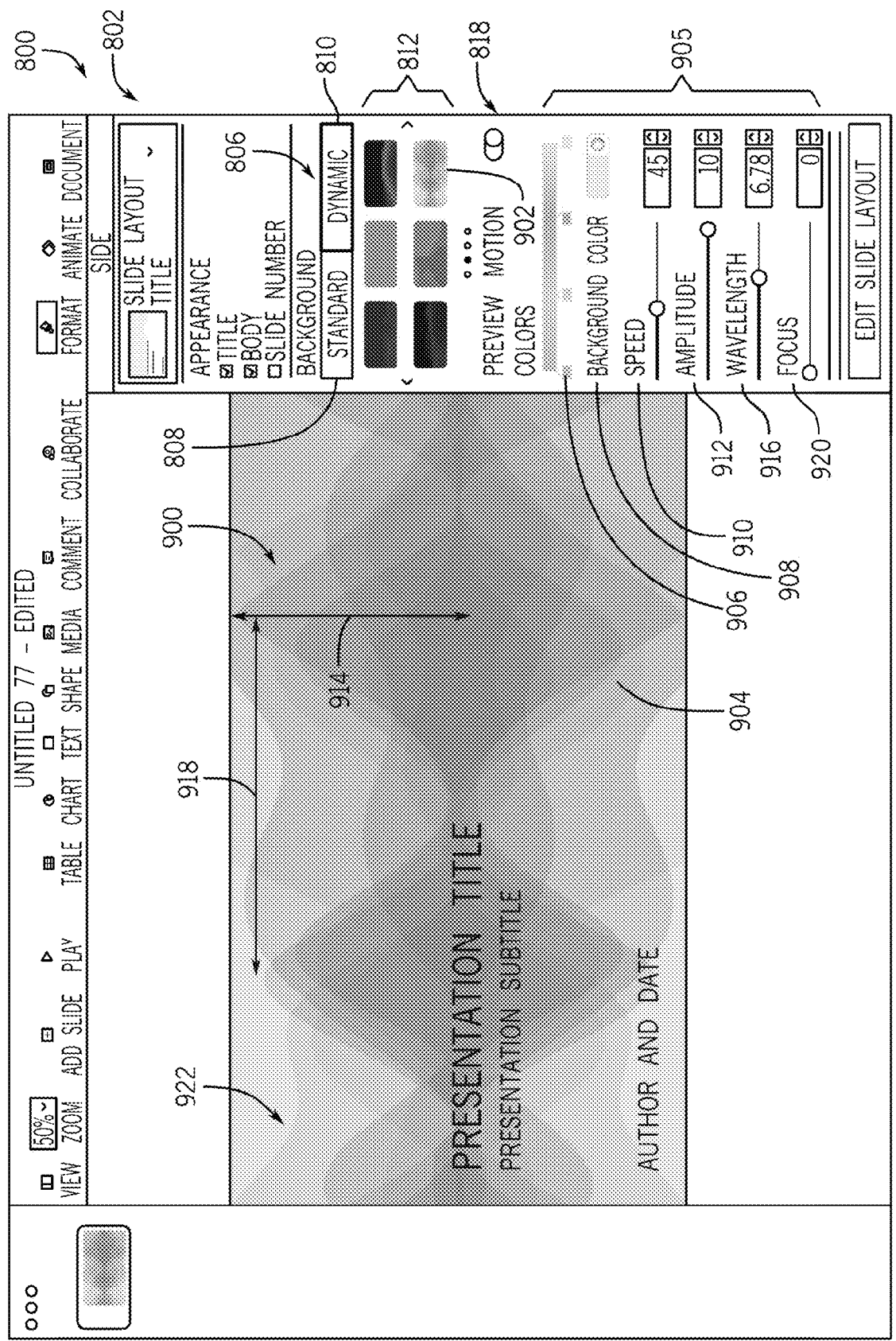
FIGS. 9A and 9B illustrate adjustments made to a Waveform Dynamic motion background, in accordance with an embodiment.
Figure 9B:
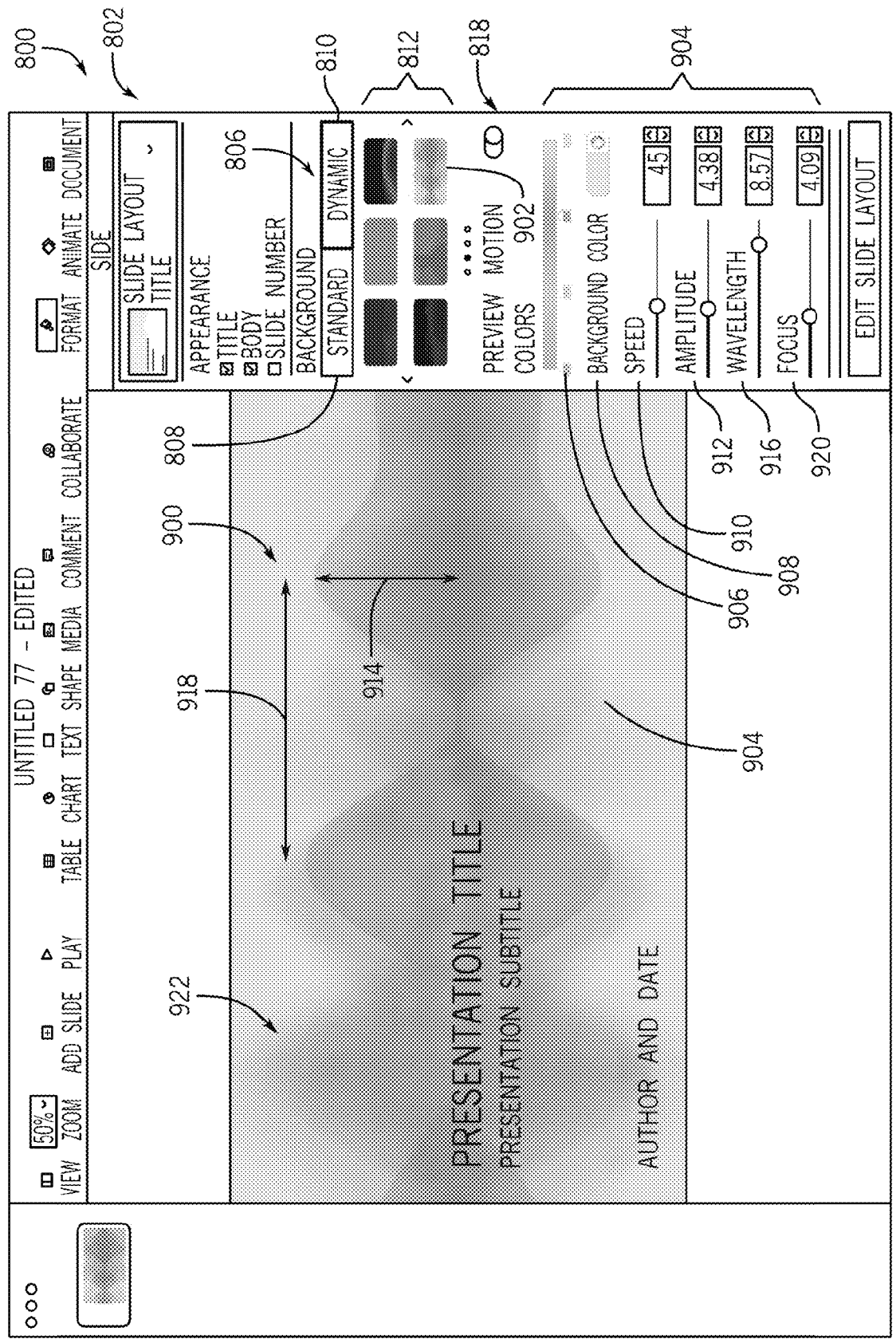

FIGS. 9A and 9B illustrate a progression adjustment made to a Waveform Dynamic motion background, in accordance with an embodiment. FIGS. 9A and 9B include the same GUI 800 that includes the slide formatting menu 802 for adjusting formatting of slide 900. Further, the GUI 800 includes the background formatting section 806 that displays the motion animation list 812 associated with affordance 810. Here, however, the user has selected affordance 902, which is associated with a waveform geometric function that provides waveform shapes in a motion animation 904.

Selected affordance 902 is associated with different default parameters/parameter values 905, which are displayed in the dynamic motion control section 818. For example, in contrast to the five color nodes 820 of FIGS. 8A and 8B, the selected affordance 902 is associated with four color nodes 906 preset to various shades of orange. Further, a selected affordance 902 is associated with a background color option 908 that, when modified may adjust a background color associated with the background motion animation 904. As in FIGS. 8A and 8B, a speed parameter 910 is present, which may be used to adjust a speed of movement of the shapes. Waveform shape parameters may be adjusted to adjust the generated shapes in the motion animation 904. An amplitude parameter 912 may adjust amplitude 914 magnitudes of the generated waveform shapes, while a wavelength parameter 916 may adjust a wavelength 918 of the generated waveform shapes. The focus parameter 920 may adjust a focus 922 of the generated waveform shapes, creating a relative sharp and/or relatively fuzzy look to the shapes.

Figure 10A:
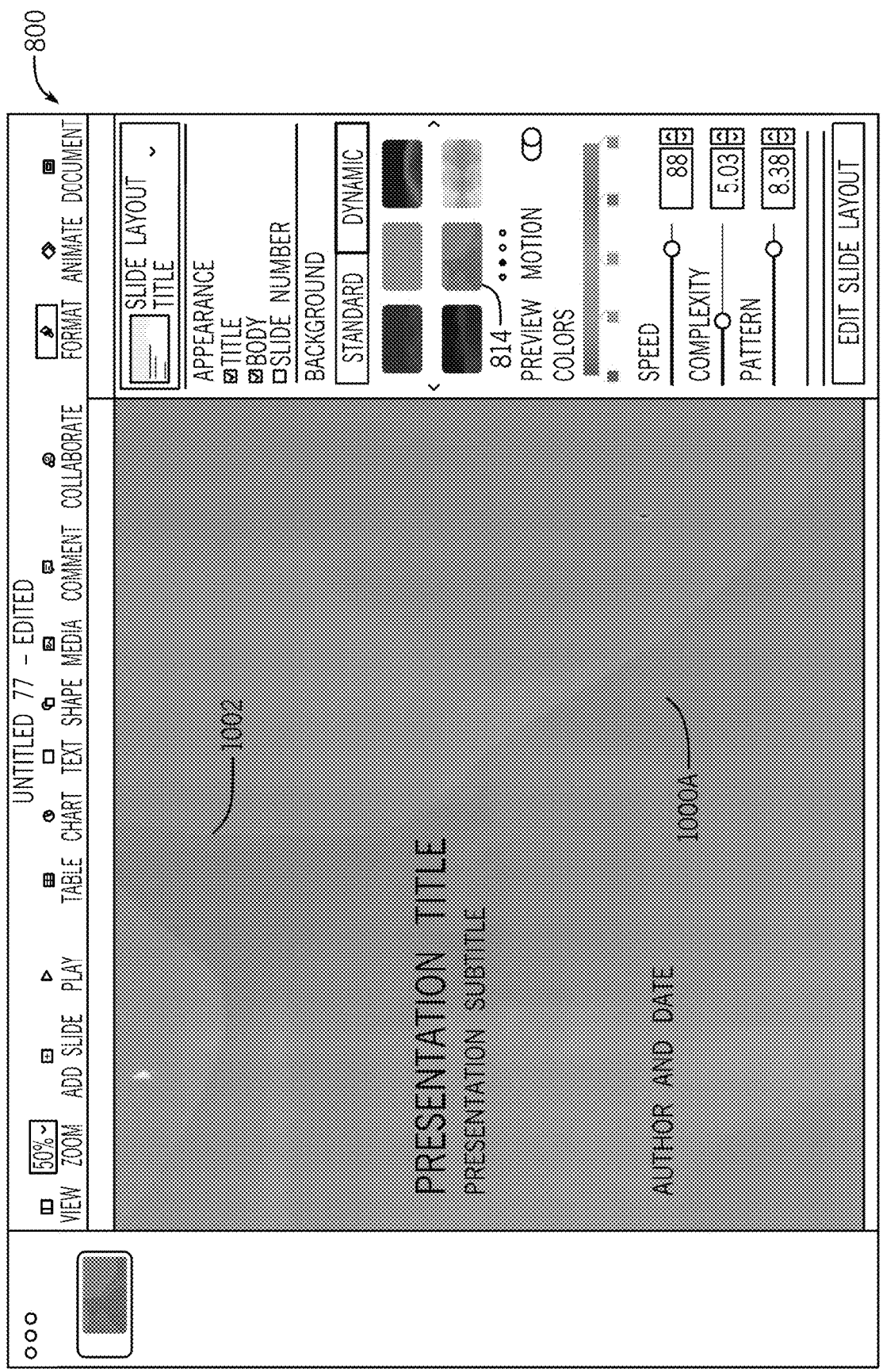
FIGS. 10A, 10B, and 10C illustrate adjustments made to a Blobby Dynamic motion background, in accordance with an embodiment.
Figure 10B:
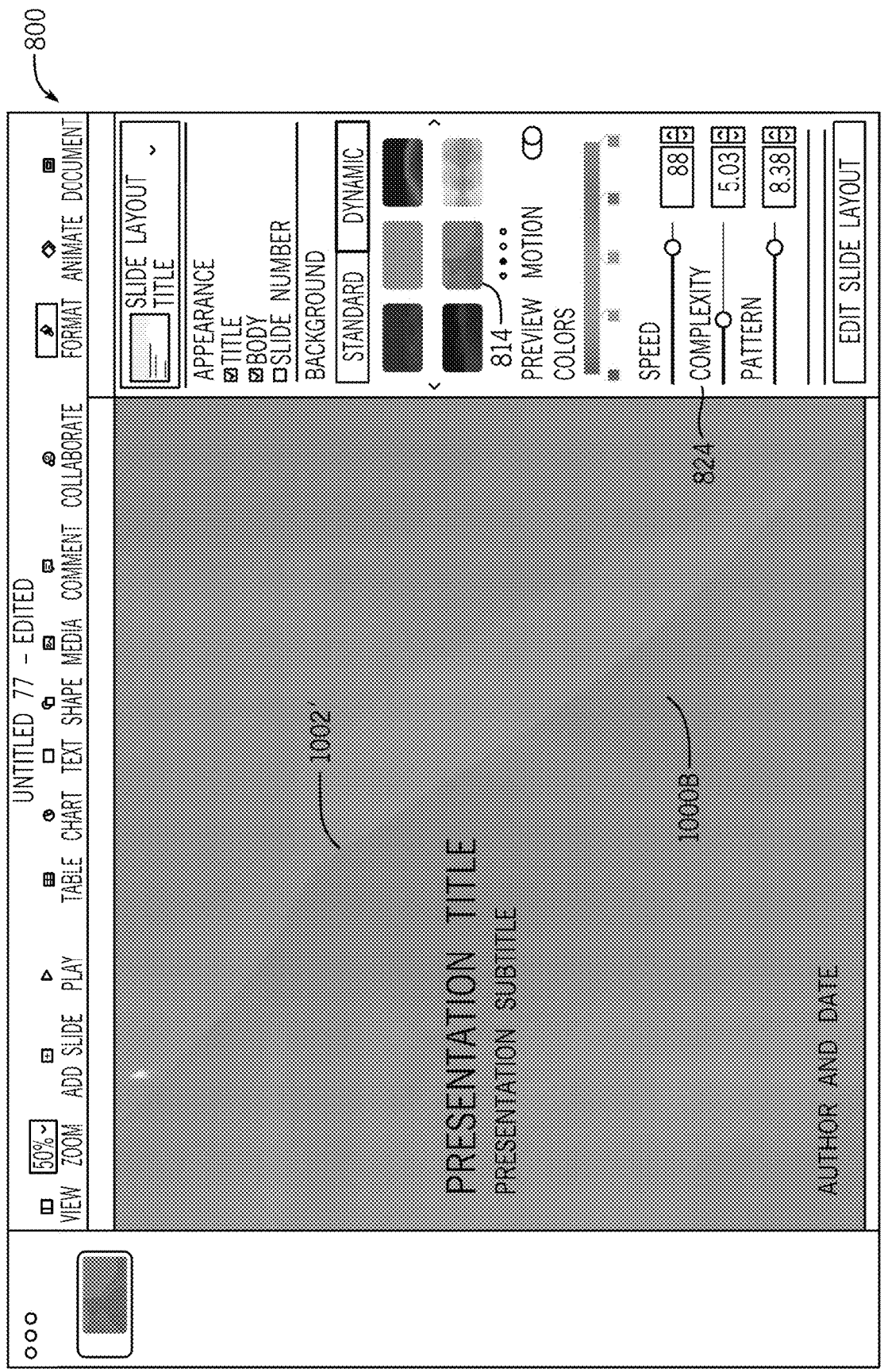
Figure 10C:
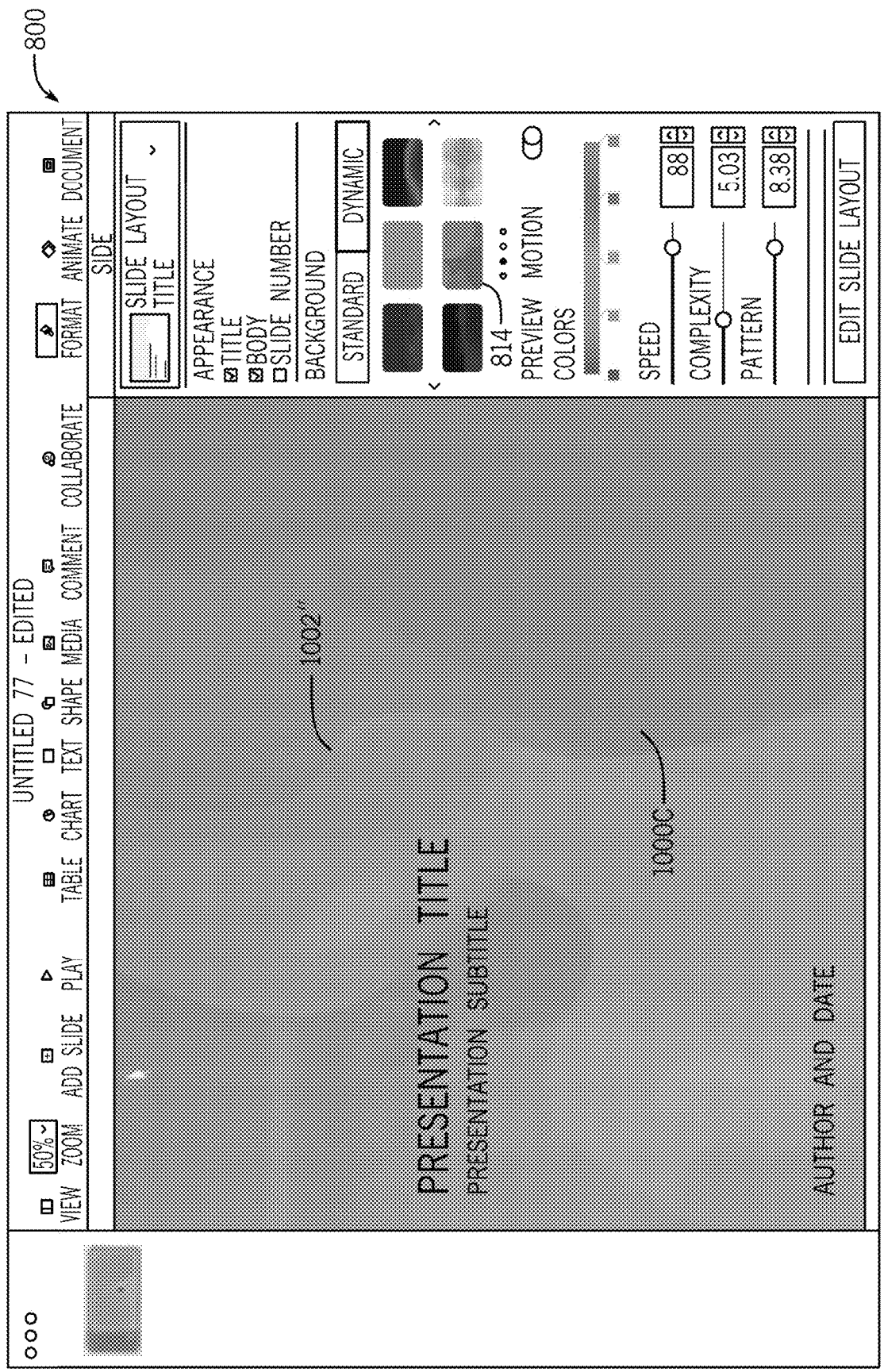

Turning now to example modifications to a blobby-providing geometric function dynamic motion background, FIGS. 10A, 10B, and 10C illustrate a progression of adjustments made to a blobby dynamic motion background, in accordance with an embodiment. In FIG. 10A, an original dynamic motion background is generated and rendered based upon the geometric function and parameter values associated with the selected affordance 814.

In FIG. 10B, a modified motion animation 1000B is generated and displayed in the background based upon an adjustment to the complexity parameter 824. Here, the complexity parameter 824 has been reduced, causing the complexity to decrease from motion animation 1000A. In other words, the shapes have become less "curvy" and more flattened, as illustrated by shape outline 1002 versus shape outline 1002'.

In FIG. 10C, a modified motion animation 1000C is generated and displayed in the background based upon an adjustment to the pattern parameter 826. Here, the pattern parameter 826 has been increased, causing the shape pattern to change from motion animation 1000A. For example, in contrast to the peak patterns provided in motion animation 1000A the shapes in modified motion animation 1000C provide a curvier column looking shape, as illustrated by shape outline 1002 versus shape outline 1002".

Figure 11A:
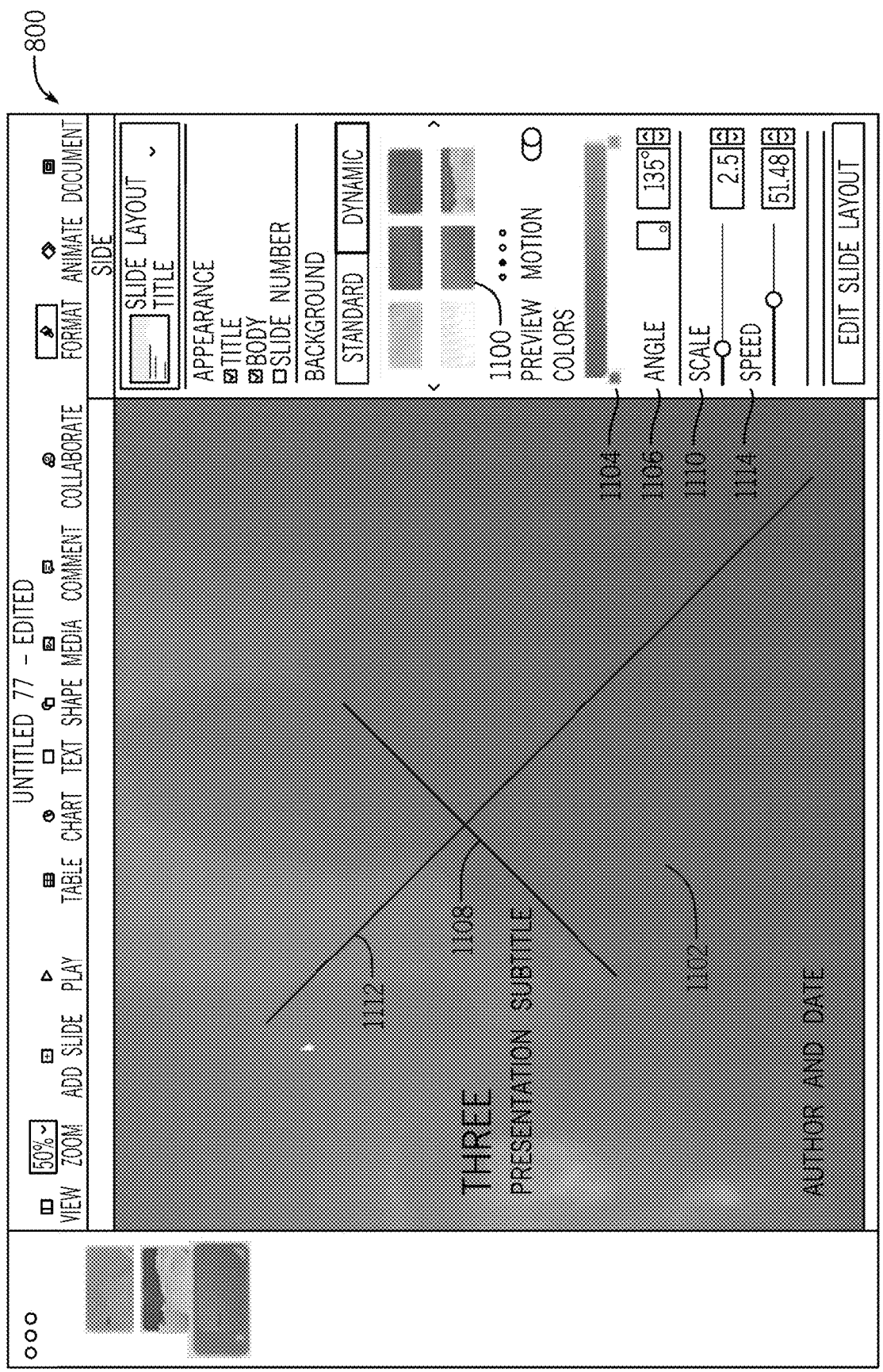
FIGS. 11A and 11B illustrate adjustments made to a Gradient Dynamic motion background, in accordance with an embodiment.
Figure 11B:
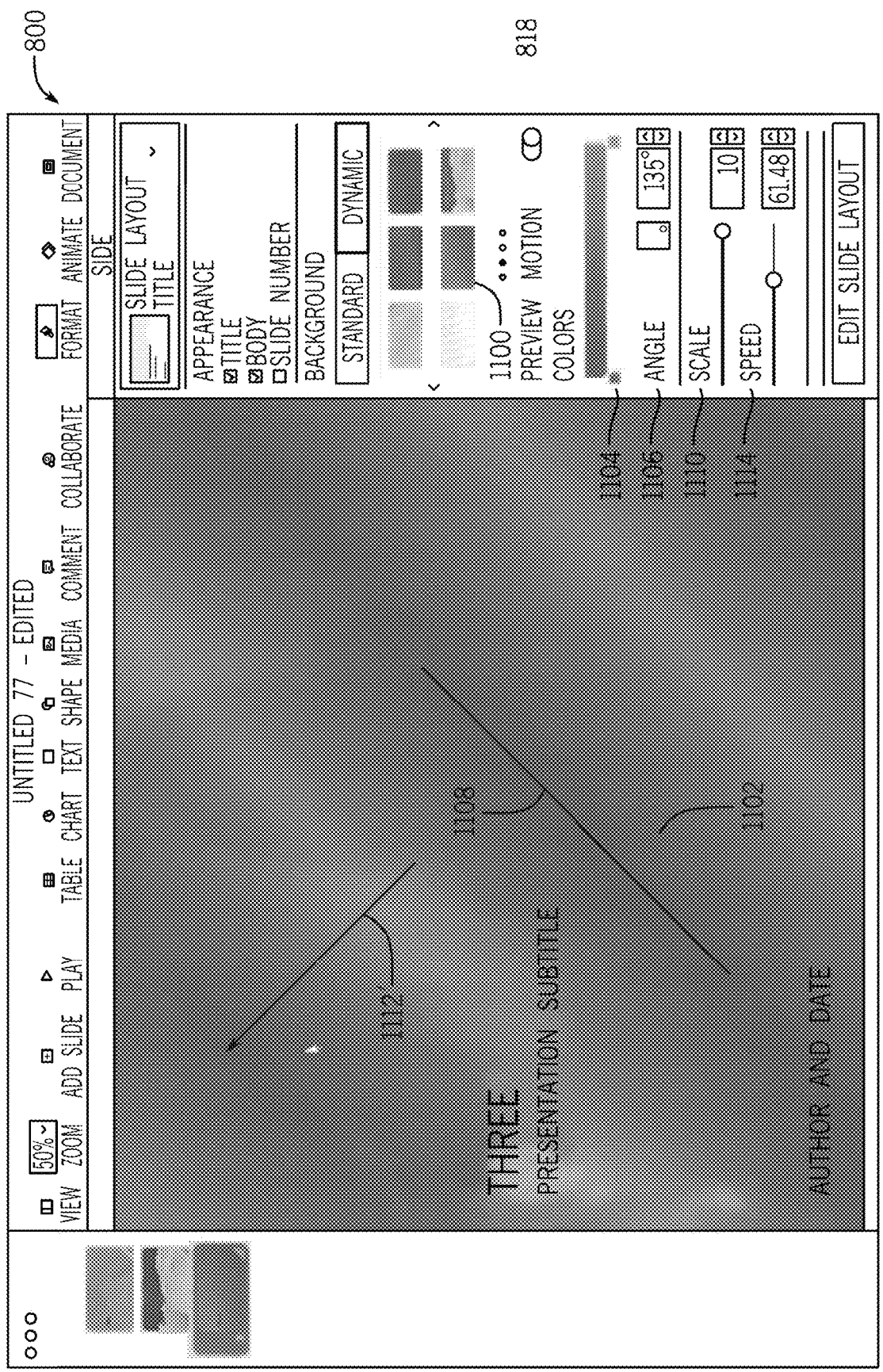

Turning now to a gradient-based motion animation, FIGS. 11A and 11B illustrate adjustments made to a Gradient Dynamic motion background, in accordance with an embodiment. The gradient geometric function provides a tapered color gradient across the dynamic motion region. In the current embodiment, a selectable affordance 1100 results in the background dynamic motion animation 1102. The selectable affordance 1100 is associated with two color nodes 1104 (though in other embodiments and/or other selectable affordances associated with a gradient geometric function additional color nodes may be provided (e.g., to provide a rainbow color gradient)). An angle parameter 1106 indicates where the gradient angle should lie. For example, here the gradient angle is 135 degrees, resulting in a diagonal gradient color transition 1108 from the first color node color value to the second color node color value, where the dynamic motion moves the color gradient in a repeating pattern towards the upper lefthand portion of the background. The scale parameter 1110 determines the length of the gradient transition. For example, here, the scale is set to a value that cause the color transition to occur across a significant point of the screen, as indicated by transition line 1112. In contrast, in FIG. 11B, the scale parameter is adjusted, such that the transition is much quicker, causing a repeating moving gradient, as illustrated by reduced transition line 1112' The speed parameter 1114 determines how fast the movement occurs (e.g., velocity of the animation on screen).

Figure 12A:
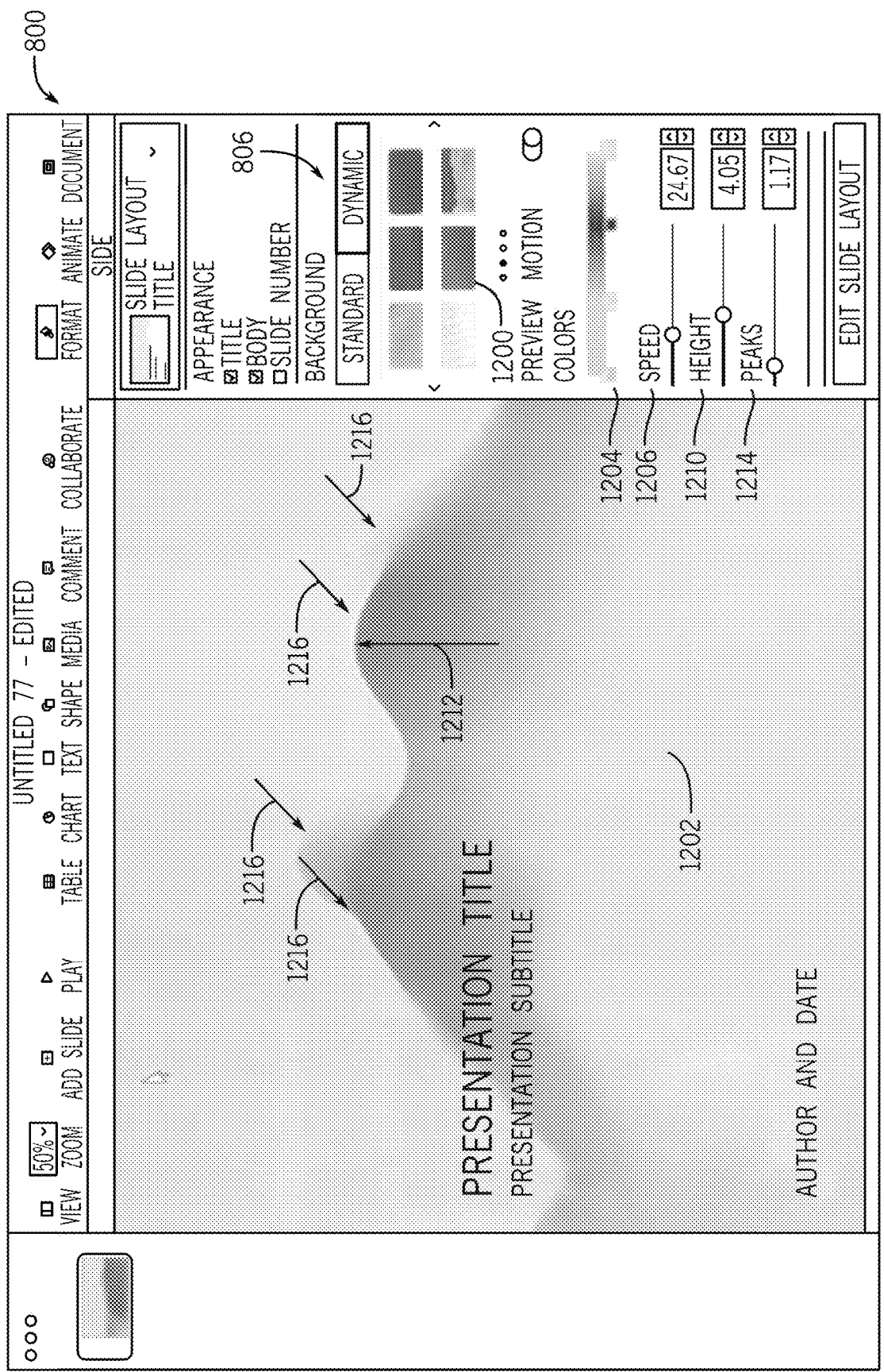
FIGS. 12A, 12B, and 12C illustrate adjustments made to a Mountains Dynamic motion background, in accordance with an embodiment.
Figure 12B:
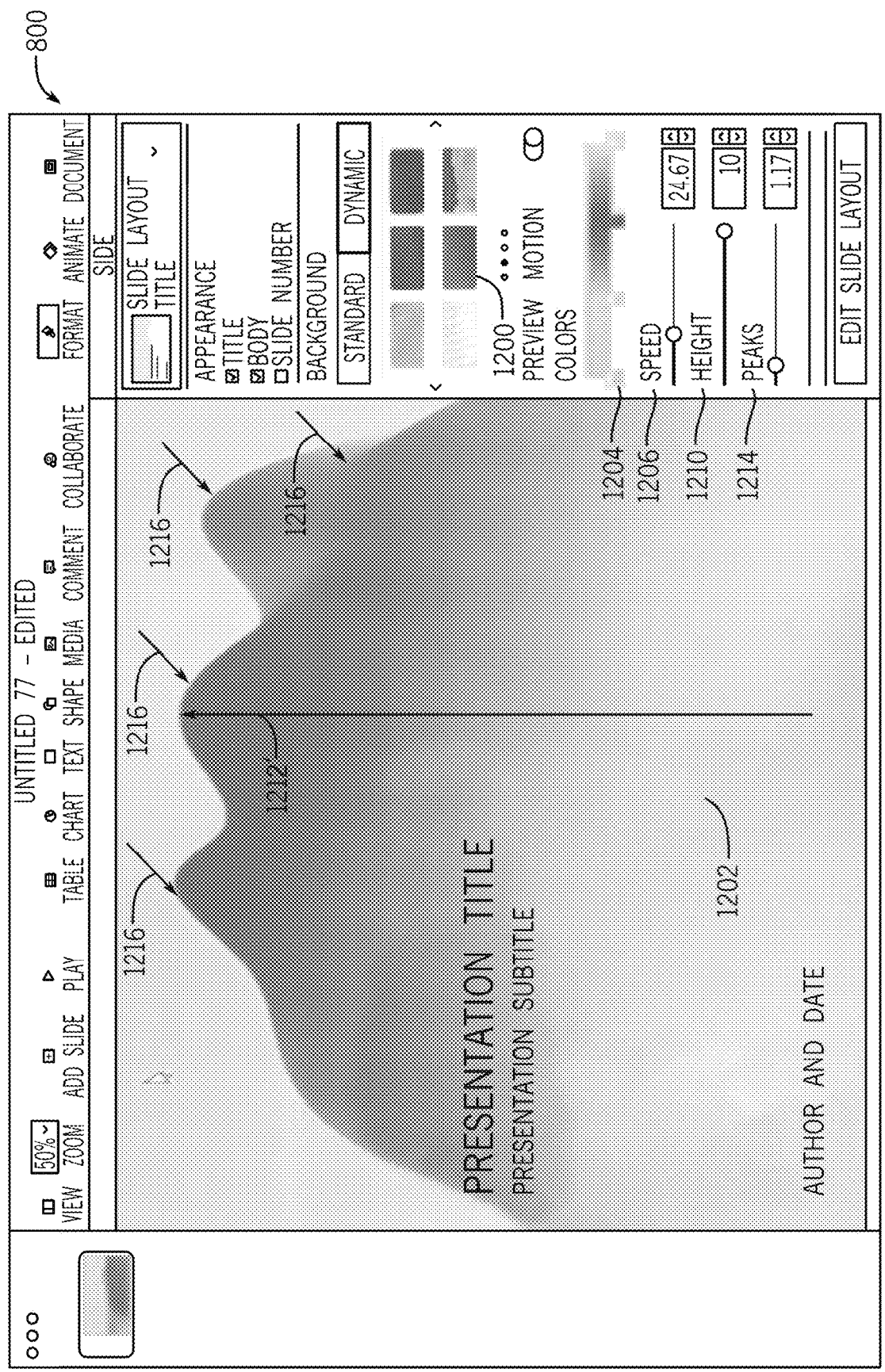
Figure 12C:
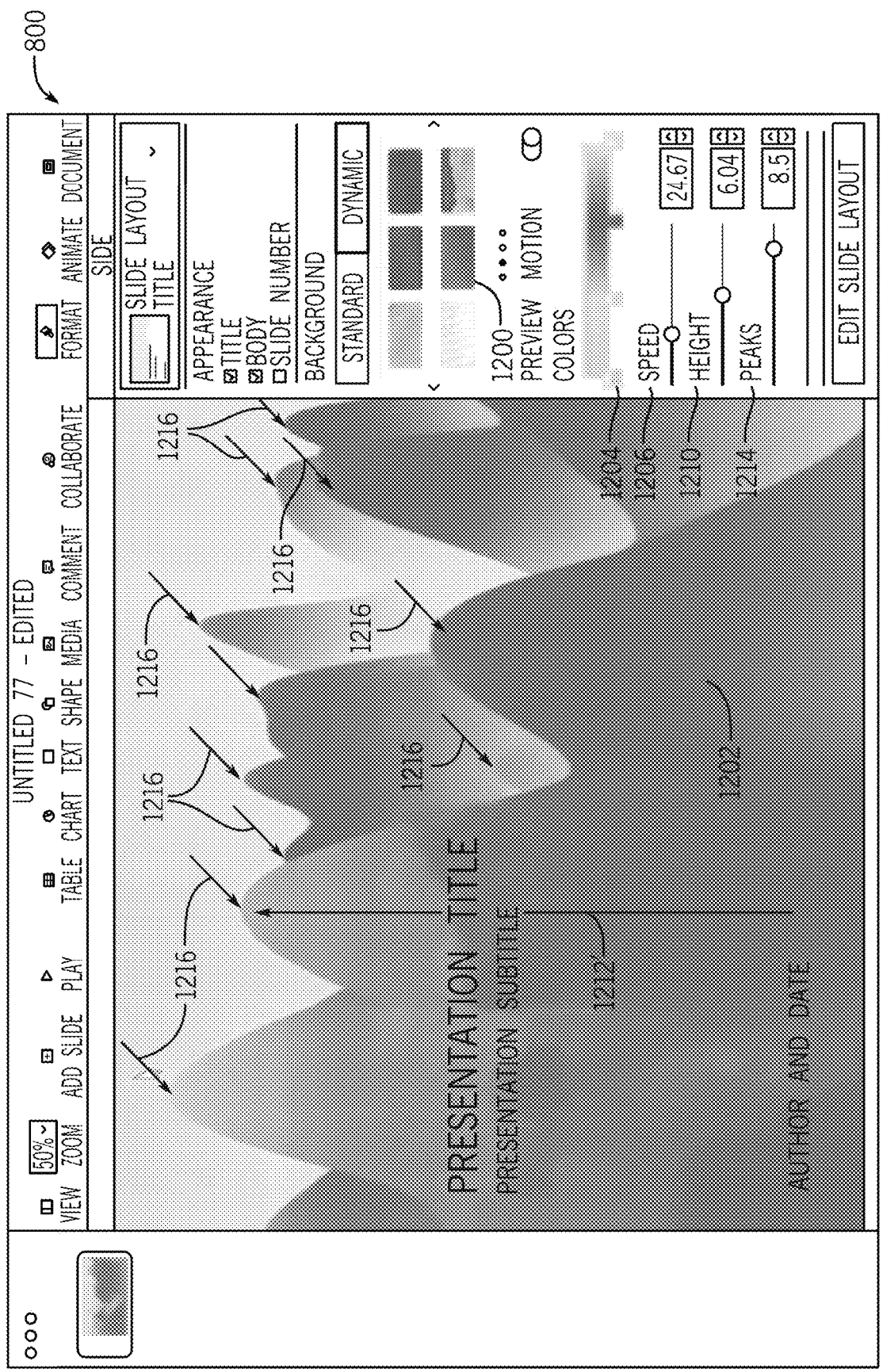

Turning now to a mountain-shaped dynamic motion animation, FIGS. 12A, 12B, and 12C illustrate adjustments made to a mountain-shaped dynamic motion background, in accordance with an embodiment. The mountain-shaped dynamic motion animation is generated based upon an affordance selection 1200 that is associated with a geometric function that generates shapes with mountain-like peaks and bases. The geometric function may use different color parameters 1204 (e.g., here four color nodes, transitioning from base colors to peak colors) to provide transitions from the peaks to the bases and make use of a speed parameter 1206 to adjust how the generated shapes move over time, while a height parameter 1210 provides an indication of how tall the generated mountain shapes should be (e.g., as indicated by height arrow 1212). A peaks parameter enables an adjustment to the number of peaks that may be generated in the motion animation (e.g., four, here, as indicted by arrows 1216).

In FIG. 12B, the dynamic motion 1202 is altered based upon a change to the third color node from purple to pink. Further, the height parameter 1210 has been adjusted to add height to the generated mountain shapes, as indicated by height arrow 1212'. The number of peaks has stayed relatively consistent, as the peak parameter 1214 has not been adjusted, as indicated by arrows 1216. In FIG. 12C, the dynamic motion 1202 is further altered, by adjusting the peaks parameter 1214 to include additional peaks, as indicated by arrows 1216.

Figure 13:
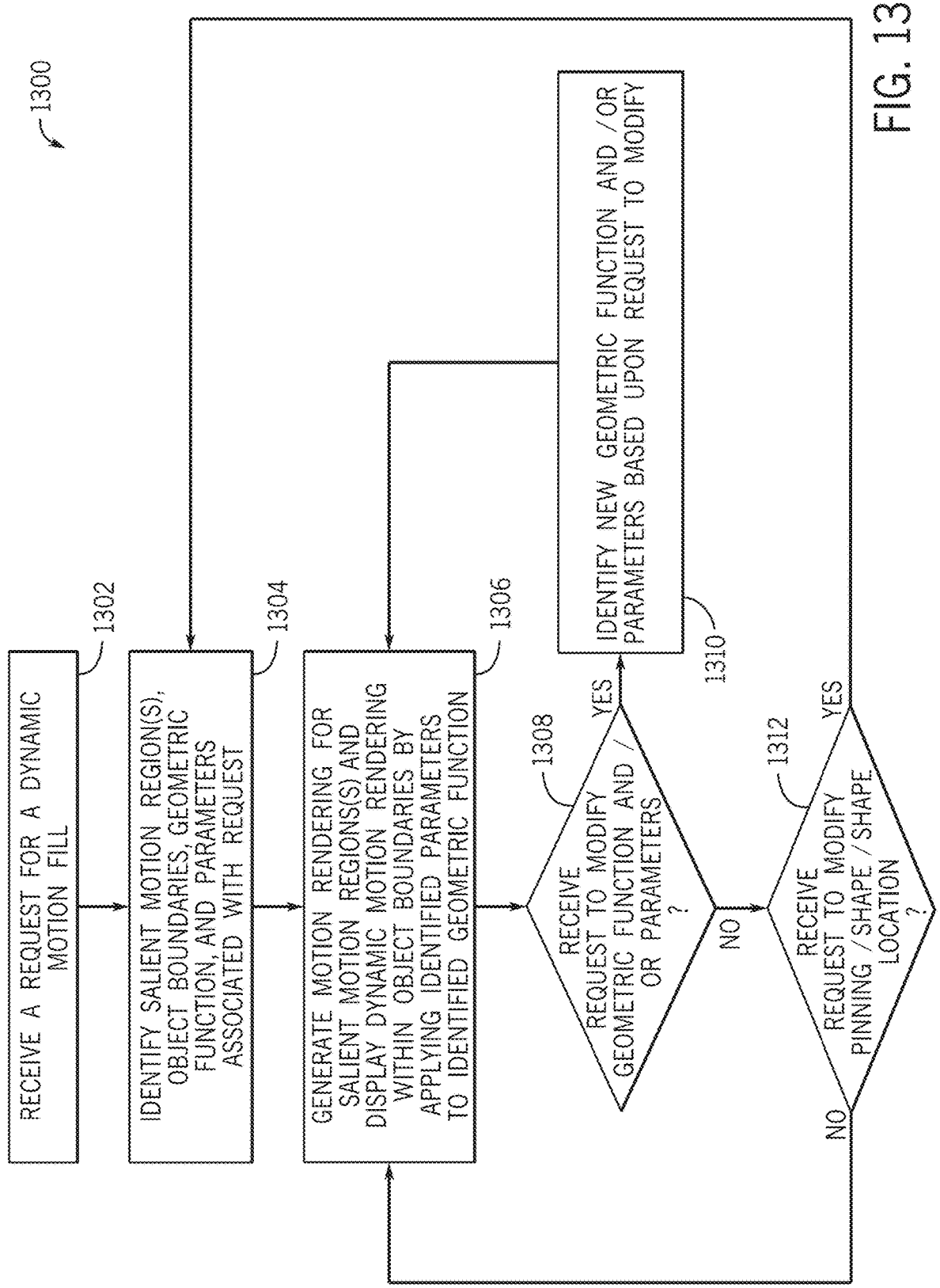
FIG. 13 is a flowchart, illustrating a process for implementing dynamic motion fills in a productivity software application, in accordance with an embodiment.
Figure 14:
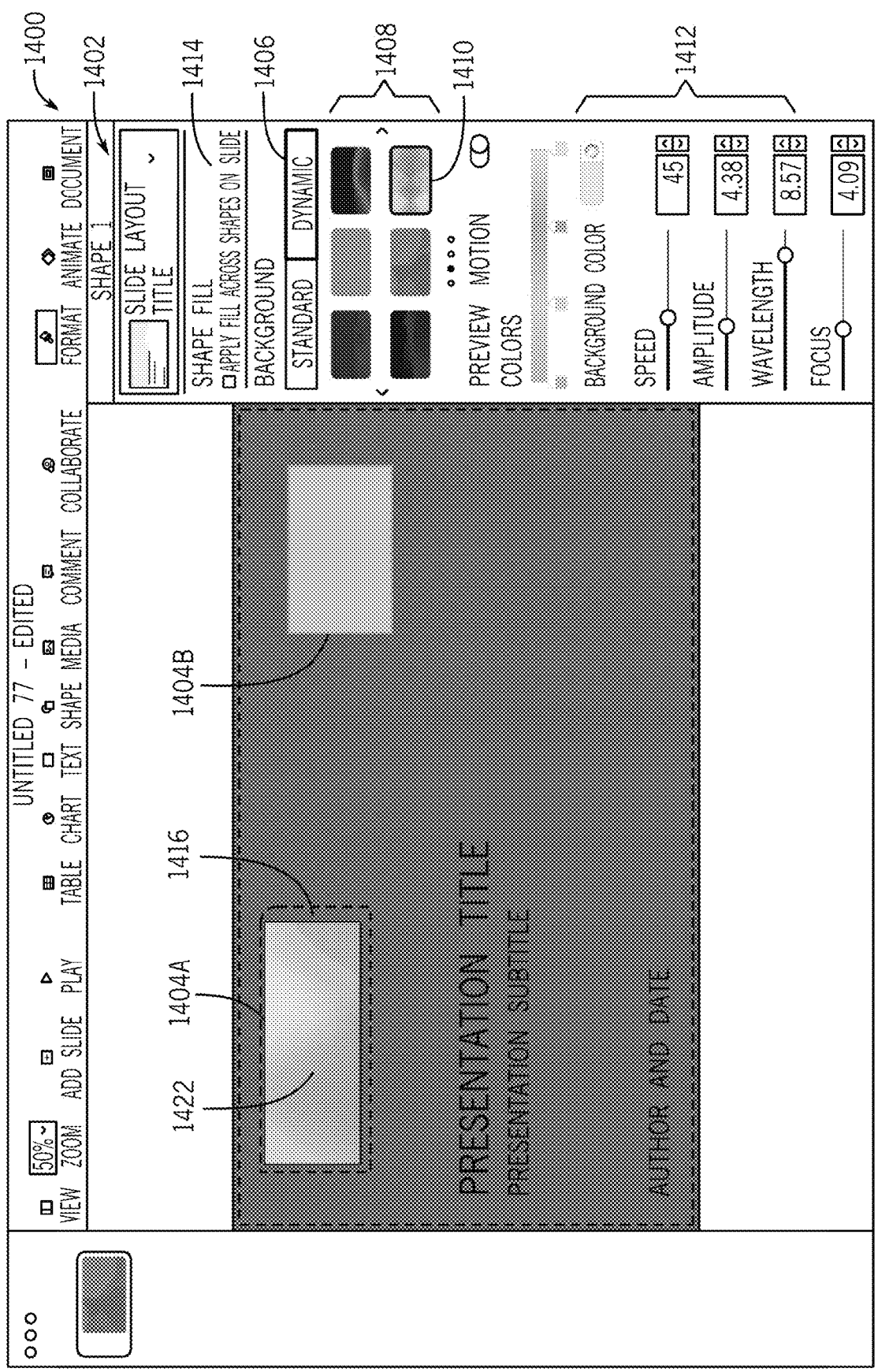
FIG. 14 illustrates an unpinned dynamic motion fill within a productivity software application, in accordance with an embodiment.
Figure 15:
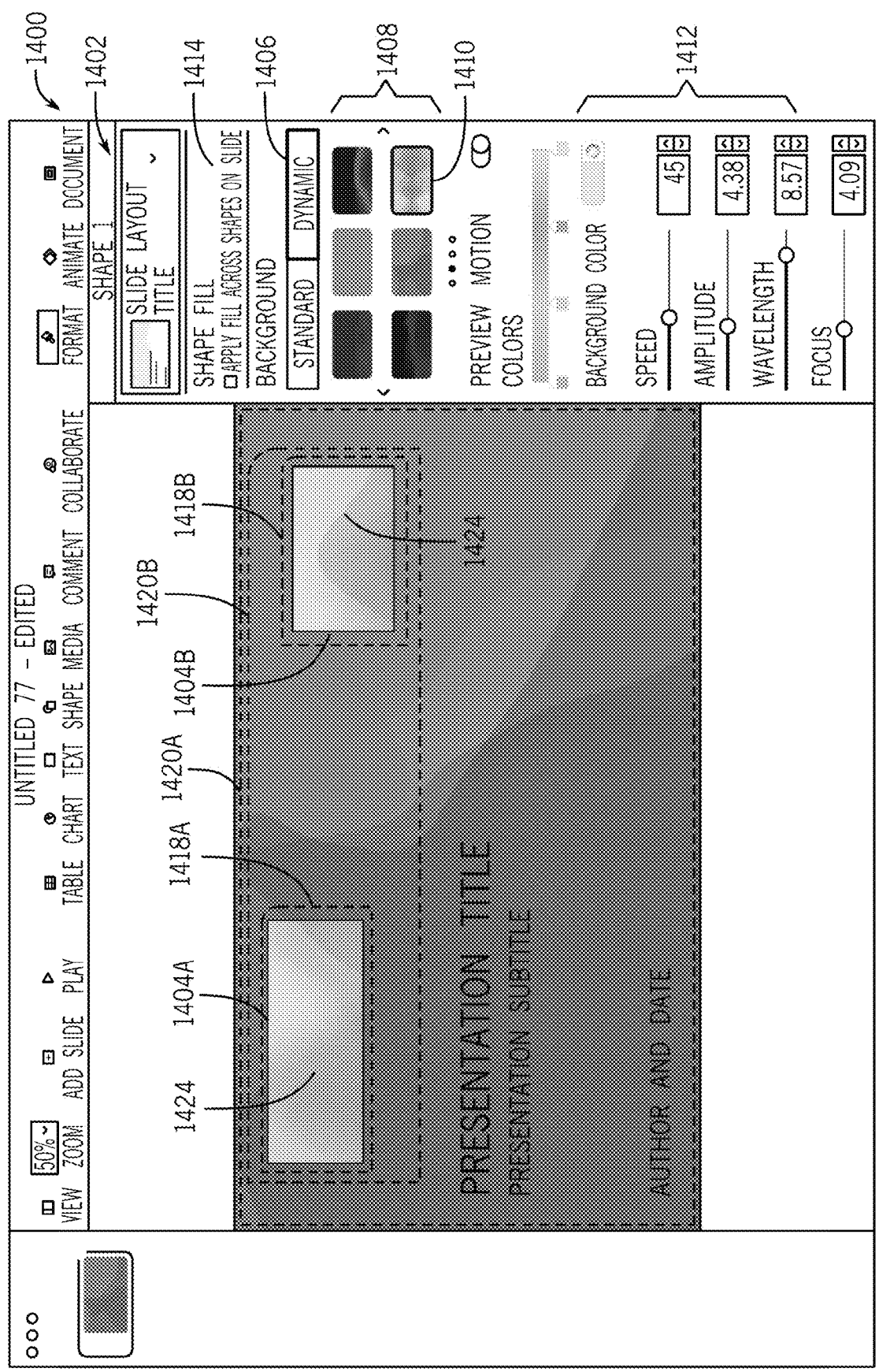
FIG. 15 illustrates a pinned dynamic motion fill within a productivity software application, in accordance with an embodiment.

As mentioned above, in addition to being used as a background animation, generated dynamic motion animation may also be used as a fill for objects within content of the software application. FIG. 13 is a flowchart, illustrating a process 1300 for implementing dynamic motion fills in a software application, in accordance with an embodiment. FIG. 14 illustrates an unpinned dynamic motion fill within a productivity software application, in accordance with an embodiment. FIG. 15 illustrates a pinned dynamic motion fill within a productivity software application, in accordance with an embodiment. For simplicity, these figures will be discussed together.

The process 1300 begins with receiving a request for a dynamic motion animation (block 1302). For example, as illustrated in the graphical user interface (GUI) 1400 of FIG. 14, an object formatting menu 1402 provides modifiable options for a selected object (e.g., shape 1404A). The object formatting menu 1402 may include an affordance 1406 for requesting a dynamic movement animation fill for the object associated with the object formatting menu 1402 (e.g., the shape 1404A). As above, upon selection of the affordance 1406, a dynamic motion animation list 1408 may be displayed, providing selectable affordances for dynamic motion animation fill options (e.g., having associated geometric functions and/or parameters/parameter values).

Salient motion regions, object boundaries, geometric functions, and parameters associated with the request are identified (block 1304). As illustrated in FIG. 14, affordance selection 1410 is selected, which may be associated with a waveform geometric function along with parameters/parameter values 1412. This geometric function and these parameters/parameter values 1412 are identified based upon their associated with affordance selection 1410.

The salient motion region may be identified based upon the pinning affordance 1414. The pinning affordance 1414 may indicate whether a dynamic motion animation fill will be pinned across all objects within a slide and/or within the entire slide deck or will be specific to the selected object (e.g., shape 1404A). Here, the "Apply Fill Across Shapes on Slide" option is unchecked, resulting in fill only applying to the selected object (e.g., shape 1404A). Accordingly, the salient region is only a region associated with the selected object (e.g., shape 1404A). Thus, salient region 1416 is identified (which may be a padded region and/or an actual border region of the selected object. If pinning affordance indicates that the dynamic motion animation should be applied across multiple objects, then the salient region would be identified as regions around the multiple objects. For example, FIG. 15 illustrates an example of salient region options when pinning affordance 1414 is selected. In FIG. 15, regions 1418A and 1418B, when aggregated, may be identified as the salient region. In some embodiments, the salient region 1420A may be set as the entirety of the pinned area (e.g., slide or set of slides) and/or salient region 1420B may be identified as the salient region, as it is a contiguous area encompassing the multiple objects to be pinned. This may reduce processing power, creating a larger, but more manageable dynamic motion animation that can be masked to render only within the boundaries of 1404A and 1404B.

Once the salient regions, object boundaries, geometric function, and parameter/parameter values are identified, the dynamic motion animation is generated and rendered by creating a dynamic motion animation bounded by the salient regions, generated using the identified geometric function with the applied identified parameters/parameter values (block 1306). The dynamic motion animation is bounded/masked by the boundaries of the objects that the dynamic motion animation fill applies to. Accordingly, this may change based upon how the pinning affordance 1414 is set. As illustrated in FIG. 14, an unpinned dynamic motion animation fill 1422 is applied to shape 1404A, but not shape 1404B (which has a regular static color fill). In contrast, FIG. 15 illustrates a pinned dynamic motion animation fill 1424 applied across the salient region 1420A and/or 1420B and/or aggregated salient regions 1418A and 1418B. As may be appreciated, if the aggregated salient regions 1418A and 1418B are used, an offset may be determined between these regions and individual dynamic motion animations may be generated accounting for the offset, such that the individual dynamic motion animations may appear connected or as a single dynamic motion animation. When salient region 1420A or 1420B is used, a single dynamic motion animation may be generated and masked by boundaries of the objects to be filled (e.g., shapes 1404A and 1404B).

At decision block 1308, a determination is made as to whether a request to modify the geometric function and/or parameter/parameter values is received. For example, a user may select an alternative affordance in the dynamic motion animation list 1408, adjust one of the default parameter/parameter values 1412, etc. If such a request is received, a new geometric function and/or parameter/parameter values associated with the request are identified and a modified dynamic motion region fill is generated and displayed (block 1310).

Otherwise, if no modification request is received for the particular fill geometric function and/or parameter/parameter values, a determination is made as to whether there is a request to change to pinning options, object boundaries, and object locations of dynamic motion animation filled objects (decision block 1312). If not, the dynamic motion animation fill may continue to render unchanged until a request and/or trigger to halt the animation is received. However, if such a modification request is received at decision block 1312, the salient motion regions and/or object boundaries may be re-identified, as they may have changed (block 1304). The dynamic motion rendering may be re-generated based upon the re-identified motion regions and/or object boundaries.

Figure 16:
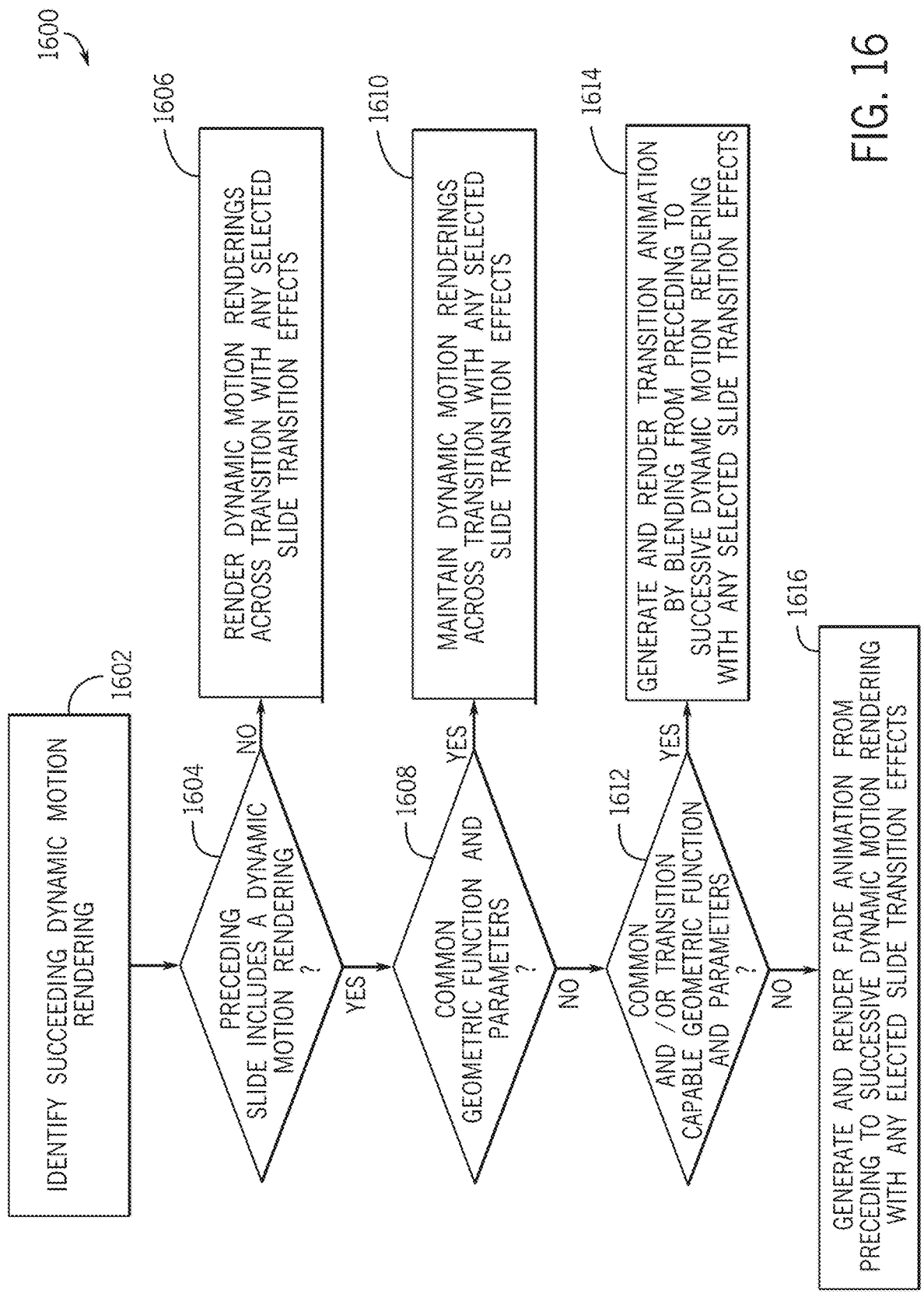
FIG. 16 is a flowchart, illustrating a process for dynamic motion transitions within transitions of productivity software application content, in accordance with an embodiment.

Having discussed the generation of the dynamic motion animation for both backgrounds and object fills, the discussion now continues with a discussion of dynamic motion animation transitions. FIG. 16 is a flowchart, illustrating a process 1600 for implementing dynamic motion transitions within transitions of productivity software application content, in accordance with an embodiment.

The process 1600 begins with identifying succeeding dynamic motion renderings (block 1602). For example, in a slide presentation application, this may be identified based upon dynamic motion animation backgrounds occurring on a successive slide (e.g., a slide with a preceding slide) within a slide presentation content. For a word processing application, this may be identified based upon dynamic motion animation backgrounds occurring on a successive page (e.g., where a preceding page is present) of a word processing document.

Figure 17:
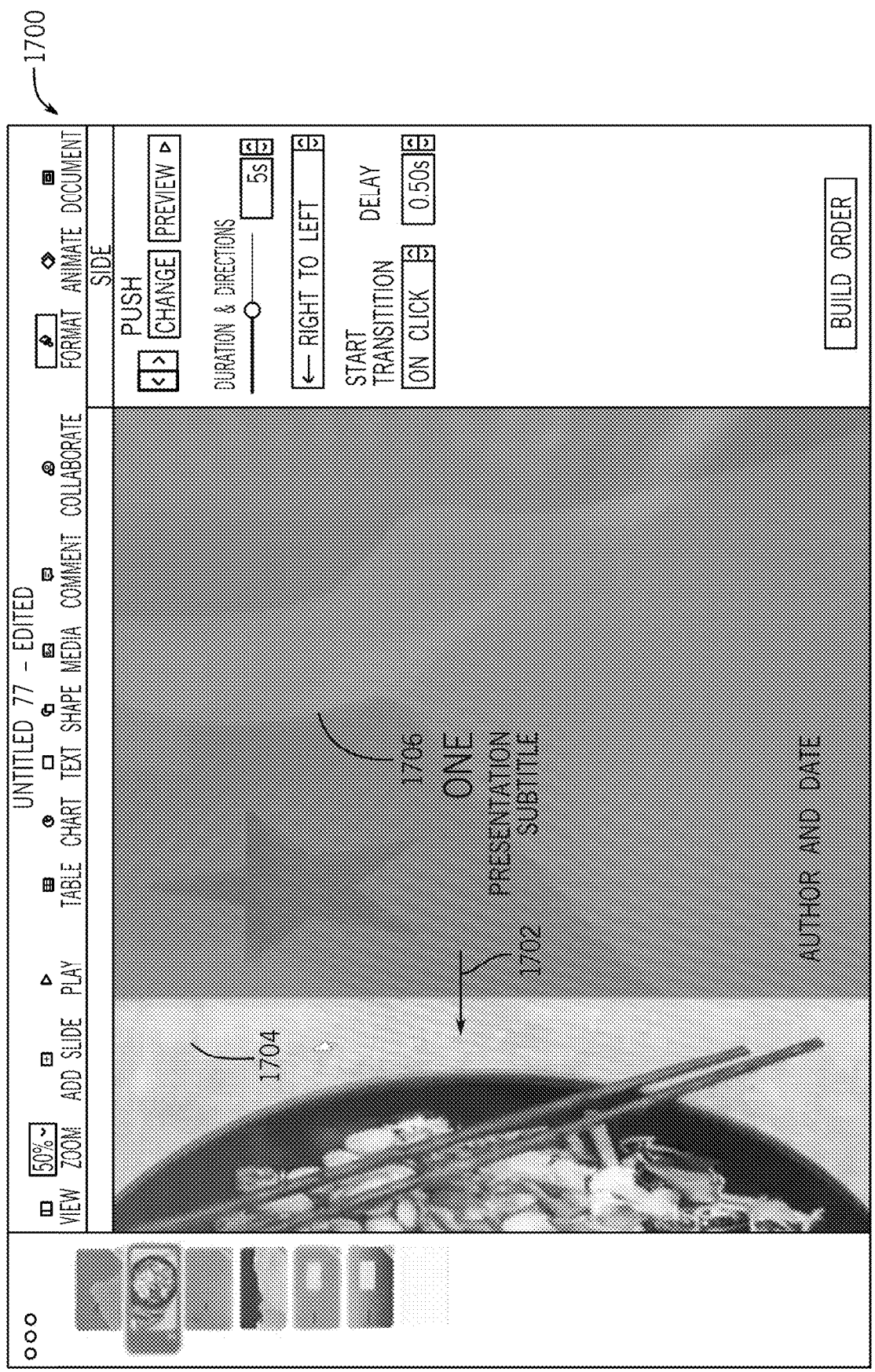
FIG. 17 illustrates a push transition effect within productivity software application content, where static content transitions to a dynamic motion background, in accordance with an embodiment.

At decision block 1604, as the succeeding portion (e.g., slide) of the content is presented, a determination is made as to whether the preceding slide includes a dynamic motion rendering. If not, the dynamic motion animation is rendered across the transition with any slide transition effects that may have been selected (block 1606). For example, FIG. 17 illustrates a presentation mode GUI 1700 where a push transition effect 1702 within productivity software application content, where static content 1704 transitions to a dynamic motion animation background 1706 by "pushing" the static content 1704 off the screen, in accordance with an embodiment. As the transition is occurring, the dynamic motion animation background 1706 is rendering movement, creating seamless movement will implementing the push transition effect.

Returning to FIG. 16, if the preceding slide does include a dynamic motion rendering, a determination is made as to whether a common geometric function and parameter/parameter values are used in the preceding and succeeding dynamic motion animations (decision block 1608). If so, a common dynamic motion rendering is maintained across the transition with any selected transition effects being applied (block 1610). In this manner, a contiguous dynamic motion animation may be rendered across the slides, potentially reducing processing burdens and creating a cohesive presentation.

If, however, the geometric function and/or parameters/parameter values are not consistent across the transition (e.g., between the preceding and succeeding slides), a determination is made as to whether a common and/or transition capable geometric function and/or parameters/parameter values are used across the transition (decision block 1612). For example, when a common geometric function is used and only the parameters/parameter values are changed or when a transition function is present that can transform shapes of one geometric function into shapes of another geometric function, the transition may blend or morph from the preceding dynamic motion animation to the succeeding dynamic motion animation, implementing any selected slide transition effects in the process (block 1614).

Figure 18:
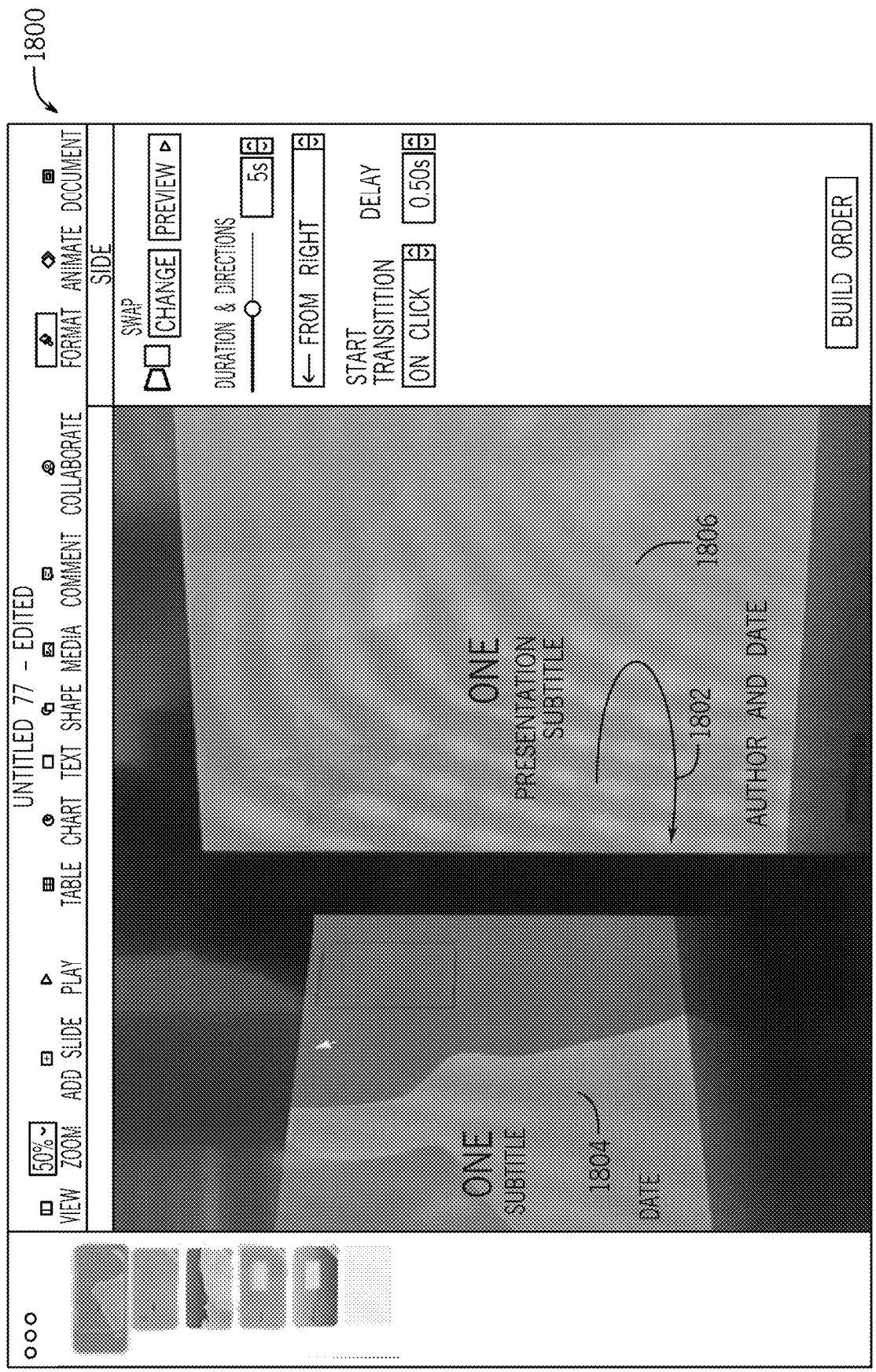
FIG. 18 illustrates a swap transition effect within productivity software application content, where a slide with dynamic motion content transitions to a different slide with dynamic motion content, in accordance with an embodiment.

For example, FIG. 18 illustrates a GUI 1800 where a swap transition effect 1802 is presented within productivity software application content, where a preceding slide 1804 with a dynamic motion animation background transitions to a succeeding slide 1806 with a different dynamic motion animation background that can be blended or morphed to during the transition, in accordance with an embodiment. Indeed, the only difference between the dynamic motion animation background of slide 1804 and that of slide 1806 is a coloring of one of the sections of the dynamic motion animation background. Accordingly, during the transition, a color blend from the preceding color to the succeeding color may be implemented, gradually transitioning from the old color to the new color during the transition. Accordingly, upon completion of the transition to the succeeding slide 1806, the dynamic motion animation background of slide 1806 may be fully rendered.

Returning to FIG. 16, if a common geometric function and/or a transition capable geometric function and/or parameters/parameter values are not used, the transition may be implemented by generating and rendering a fade animation that fades out the preceding dynamic motion animation background and fades in the succeeding slide's dynamic motion animation background, while rending any selected slide transition effects in the process (block 1616). In this manner, a more fluid presentation experience may be provided, avoiding any jarring transitions in dynamic motion animation backgrounds.

This process 1600 may proceed for each succeeding portion that includes a dynamic motion animation. Further, while process 1600 has been discussed with respect to dynamic motion animation backgrounds, a similar process could be implemented for dynamic motion animation fills.

Figure 19:
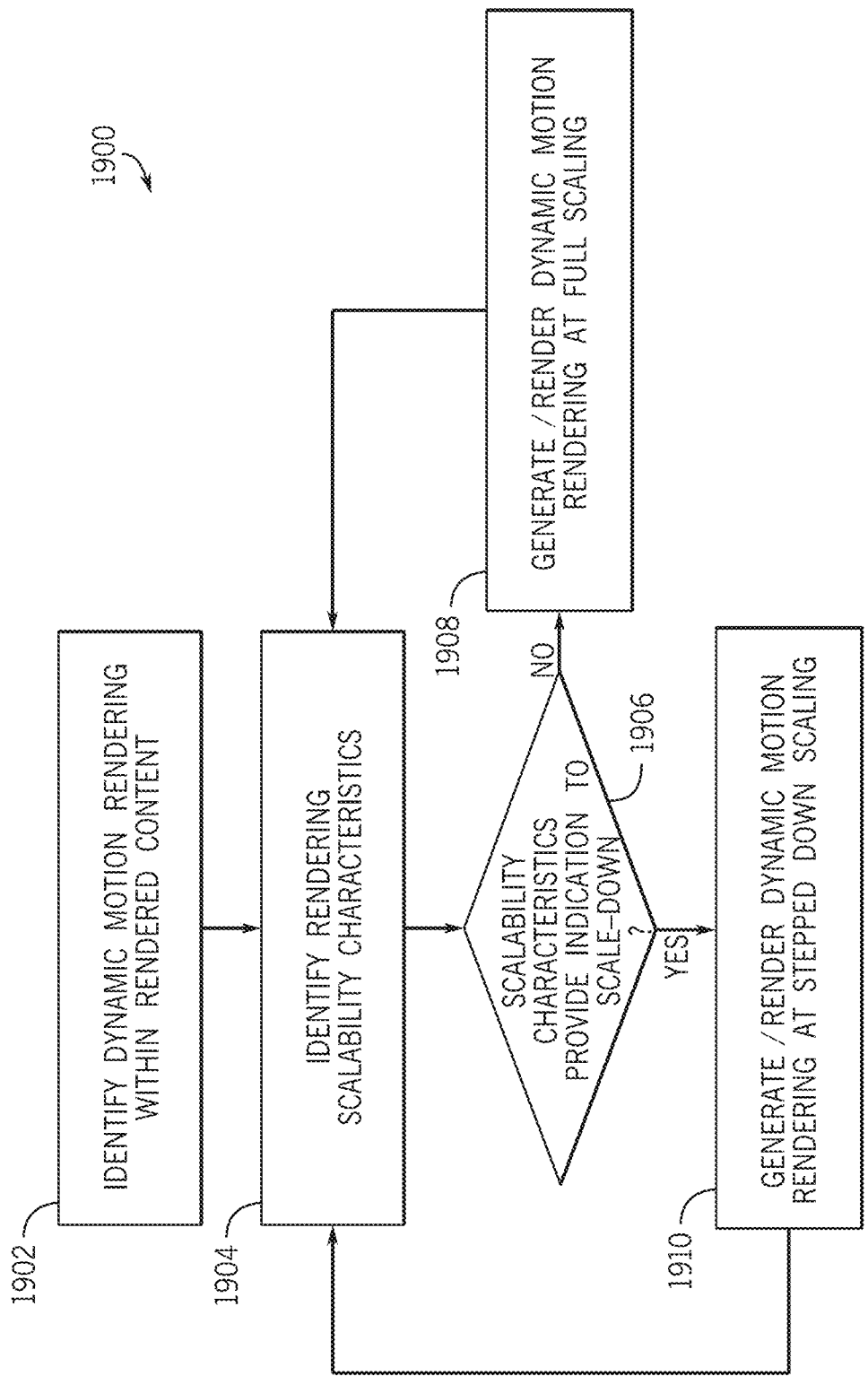
FIG. 19 is a flowchart, illustrating a process for scalable dynamic motion rendering, in accordance with an embodiment.

Turning now to a discussion of scaling dynamic motion animations, from time to time, it may be desirable to scale down dynamic motion animations. For example, scaled down dynamic motion animations may result in reduced power consumption, reduced thermal profiles of processing devices generating the dynamic motion animations, reduced output size, etc. The dynamic motion animation may be scaled down by lowering the framerate (e.g., from 60 or 120 frames per second to 20 frames per second) at least during a portion of a presentation (e.g., when a build or transition occurs). Further, lower complexity shapes (e.g., fewer polygons in the shape mesh or fewer samples per pixel in a shader) may be used. FIG. 19 is a flowchart, illustrating a process 1900 for scalable dynamic motion rendering, in accordance with an embodiment.

The process 1900 begins with identifying dynamic motion rendering within rendered content (block 1902). For example, calls to dynamic motion rendering engine may be identified within slides of slide presentation content.

When dynamic motion rendering is present within rendered content, rendering scalability characteristics are identified (block 1904). For example, as mentioned above, dynamic motion animation renderings may utilize significant processing resources to render the procedurally-generated, constantly-moving graphical content. Accordingly, this resource utilization (e.g., processing power, storage use, etc.) along with side-effects of this use (e.g., increased thermal profile) and resource availability characteristics (e.g., battery level, available memory, available processing power, power source, etc.) may be monitored to identify if scaling down may be desirable.

A determination is made as to whether the scalability characteristics provide an indication to scale down the dynamic motion animation (decision block 1906). The scalability characteristics may indicate to scale down the dynamic motion animation under many circumstances. First, if the thermal profile is above a threshold thermal value, this may indicate an undesirably hot processing computer, which may benefit from scaling down the dynamic motion animation. Further, if processing resource use (e.g., processing power, memory consumption, storage consumption) exceed a predefined threshold, this may indicate to scale down the dynamic motion animation. Additionally, if processing resource availability breaches a pre-determined threshold, this may indicate to scale down the dynamic motion animation. Further, certain processing device features (e.g., reduced screen size that where a scaling down may be less discernable, a non-continuous power source (e.g., battery-operation vs. plugged in power source), and/or battery level below a pre-defined threshold) may indicate to scale down the dynamic motion animation.

In some embodiments, the scalability characteristics may include an indication of an output of the presentation. For example, as mentioned above, a smaller display may indicate scaling down based upon imperceptibility when compared to a full-scale version. In some embodiments, when presenting the dynamic motion animation via video conferencing services, this may indicate to scale down as well. For example, the dynamic motion animation may be modified to improve the encoded video quality when compressed and streamed via the video conferencing service. Additionally, the dynamic motion animation may be altered to apply a large "grain" filter to smooth gradients to reduce banding, may apply a slight blur to certain high-frequency areas to reduce artifacts (e.g., moire effects), adjust color saturation to help avoid chromatic artifacts, adjust inter-frame effects (e.g., motion blur) to align with variable frame rates of compressed video streams, etc.

If the scalability characteristics do not indicate to scale down the dynamic motion animation, the dynamic motion animation rendering is generated and rendered at full scaling (block 1908). The rendering scalability characteristics may continue to be monitored for subsequent potential scaling down of the dynamic motion animation.

If the scalability characteristics indicate to scale down the dynamic motion animation, a scaled down dynamic motion animation is generated and rendered (block 1910). For example, the frame per second of the dynamic motion animation may be reduced (at least for a period of time), lower complexity shapes and/or movement may be generated by using fewer polygons in the rendering mesh, and/or fewer samples per pixel in a shader may be used. The scalability characteristics may continue to be monitored for potential further scaling down or, in the case that the scalability characteristics exceed a second threshold indicating sufficient characteristics for a step up in the dynamic motion animation, may step back up the generation and/or rendering of the dynamic motion animation.

In some embodiments, the particular scaling down technique (e.g., reducing frames per second) may be selected based upon a particular scalability characteristic indicating to scale down the dynamic motion animation. For example, as mentioned above, one scalability characteristic that may indicate to scale down may be an indication that the dynamic motion animation is or will be presented via a video conferencing service. Under such a scalability characteristic, particular scale down techniques may be beneficial. For example, as explained above, these techniques may include modifying the dynamic motion animation to improve the encoded video quality when compressed and streamed via the video conferencing service. For example, the dynamic motion animation may be altered to apply a large "grain" filter to smooth gradients to reduce banding, may apply a slight blur to certain high-frequency areas to reduce artifacts (e.g., moire effects), may adjust color saturation to help avoid chromatic artifacts, adjust inter-frame effects (e.g., motion blur) to align with variable frame rates of compressed video streams, etc.

Figure 20:
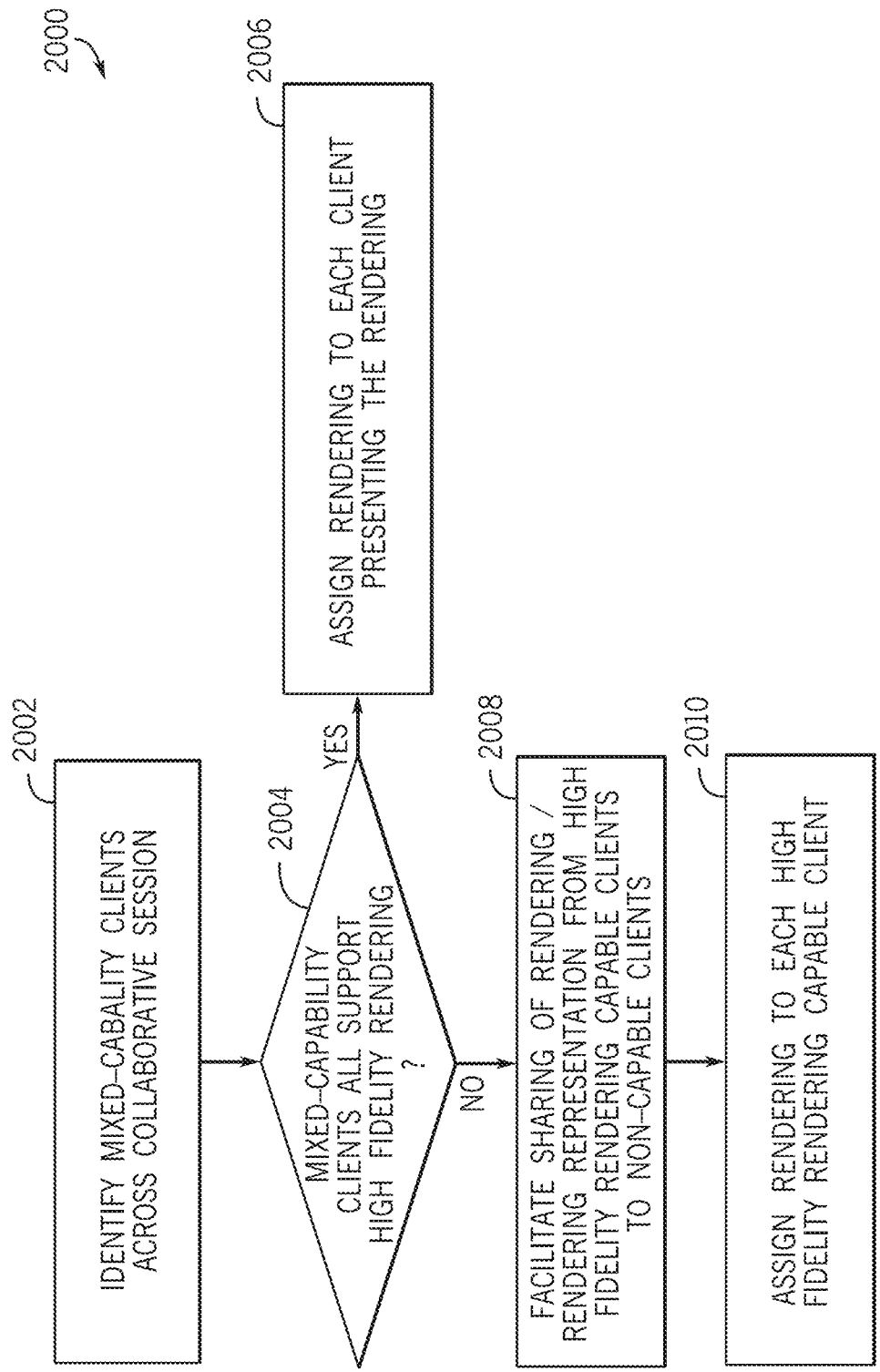
FIG. 20 is a flowchart, illustrating a process for supportive rendering of content in a collaborative environment, in accordance with an embodiment.

Turning now to collaborative productivity application considerations, FIG. 20 is a flowchart, illustrating a process 2000 for supportive rendering of content in a collaborative environment, in accordance with an embodiment. FIG. 21 illustrates a collaborative environment 2100 where supportive rendering of content is facilitated, in accordance with an embodiment. For simplicity, these figures will be discussed together.

As may be appreciated, in a collaborative environment 2100 (e.g., of a productivity application), client devices 2102A, 2102B, 2102C, 2102D, and 2102E (collectively 2102) may collaborate on preparing and/or viewing content created through the productivity software application (e.g., facilitated by the collaboration service 2104). However, not all of the clients 2102 may include the same capabilities. Indeed, some relatively lower-capability devices, such as watch client 2102A and/or un-branded smartphone client 2102B may have graphics processing units (GPUs) that only support a limited subset of features that may reduce their ability to render high fidelity dynamic motion animations. Tablet computing device client 2102C may be able to generate a scaled down version of the dynamic motion animation, while computer 2102E may be able to generate a full-scale version of the dynamic motion animation. These mixed capabilities may cause a problem, as dynamic motion animations generated by clients 2102C and/or 2102E may not be generated at clients 2102A and/or 2102B. To help mitigate presentation disparity that this may cause, process 2000 may be implemented.

Process 2000 begins by identifying mixed-capability clients across a collaborative session 2002. To do this, the collaboration service 2104 and/or the clients 2102 may poll and inventory the clients 2102 participating in a collaborative session (e.g., over the Internet 2106). The inventory may include characteristics of the clients 2102, such as make, model, available processing components/resources, etc. This inventory may be used to discern that mixed-capability clients exist in the collaborative session.

Next, a determination is made as to whether all clients 2102 support high fidelity rendering (decision block 2004). For example, the make and/or model of client 2102 and/or the available processing components/resources of the clients 2102 may provide an indication of whether high fidelity renderings of the dynamic motion animations may be rendered.

If all clients 2102 support high fidelity rendering of the dynamic motion animations, each client is assigned to render its own version of the rendering (block 2006). This results in each client 2102 rendering its own dynamic motion animation (e.g., by implementing the process 700 and/or 1300), even when the dynamic motion animation is added by another client 2102 via the collaborative session.

If not all clients are capable of rendering a high-fidelity version of the dynamic motion animation, sharing of a rendering and/or rendering representation is facilitated from a High Fidelity Rendering Capable Client to the Non-Capable Clients (block 2008). For example, the collaboration service 2104 (or one of the clients 2102) may request that the client 2102E (e.g., the most-capable client) provide a rendering/rendering representation of the dynamic motion animation to Non-Capable clients 2102A and 2102B. In turn, client 2102E may either provide a scaled down rendering of the dynamic motion animation and/or a single frame of the dynamic motion animation representative of the dynamic motion animation to the Non-Capable clients 2102A and 2102B, enabling these clients 2102A and 2102B to render the received rendering/rendering representation, despite not being able to render these themselves.

The High Fidelity Rendering Capable Clients (e.g., clients 2102C and 2102E) may also be assigned to generate their own renderings of the dynamic motion animation (block 2010). This may be the case even when another client 2102 inserts the dynamic motion animation via the collaborative session.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A tangible, non-transitory, computer-readable medium, comprising computer-readable instructions that, when executed by one or more processors of a computer, cause the computer to:
   generate and cause display of a graphical user interface (GUI) of a productivity application comprising a slide presentation software application;
   during runtime of the slide presentation software application, receive, via the GUI, a request to insert a dynamic motion animation on a first slide;
   in response to the request, during the runtime of the slide presentation software application, identify a geometric function from a geometric function library and one or more parameter values associated with the request;
   during the runtime of the slide presentation software application, generate the dynamic motion animation by applying the one or more parameter values associated with the request to the geometric function;
   provide, during the runtime of the slide presentation software application, the dynamic motion animation to cause display of the dynamic motion animation within the GUI;
   detect a transition from the first slide having the dynamic motion animation to a second slide having a second dynamic motion animation;
   transition to the second slide, by generating and presenting a transition animation from the first slide to the second slide; and
   presenting the dynamic motion animation and the second dynamic motion animation during at least one or more portions of the transition animation.

2. The tangible, non-transitory, computer-readable medium of claim 1, comprising computer-readable instructions to:
   after receiving the request to insert the dynamic motion animation, generate, during runtime, the dynamic motion animation with unique aspects that continuously animate during runtime until a request or trigger to change or halt the dynamic motion animation is received.

3. The tangible, non-transitory, computer-readable medium of claim 1, comprising computer-readable instructions to:
   receive, via the GUI, a request to modify the geometric function, the one or more parameter values, or both;
   in response to receiving the request to modify the geometric function, the one or more parameter values, or both, identify a new geometric function, a new one or more parameter values, or both associated with the request to modify the geometric function, the one or more parameter values, or both;
   regenerate the dynamic motion animation using the new geometric function, the new one or more parameter values, or both; and
   provide, during the runtime, the regenerated dynamic motion animation to cause display of the regenerated dynamic motion animation within the GUI.

4. The tangible, non-transitory, computer-readable medium of claim 1, wherein the geometric function comprises:
   a blob geometric function configured to generate blob shapes that continuously animate;
   a waveform geometric function configured to generate waveform shapes that continuously animate;
   a gradient geometric function configured to generate gradients that continuously animate;
   a mountains geometric function configured to generate mountainous shapes that continuously animate; or
   any combination thereof.

5. The tangible, non-transitory, computer-readable medium of claim 1, wherein the geometric function comprises:
   a blob geometric function configured to generate blob shapes that continuously animate; and wherein the tangible, non-transitory, computer-readable medium comprises computer-readable instructions to:
   provide, via the GUI, one or more affordances to change a speed, complexity, pattern, or any combination thereof of the blob shapes of the dynamic motion animation.

6. The tangible, non-transitory, computer-readable medium of claim 1, wherein the geometric function comprises:
   a waveform geometric function configured to generate waveform shapes that continuously animate; and wherein the tangible, non-transitory, computer-readable medium comprises computer-readable instructions to:
   provide, via the GUI, one or more affordances to change a speed, amplitude, wavelength, or any combination thereof of the waveform shapes of the dynamic motion animation.

7. The tangible, non-transitory, computer-readable medium of claim 1, wherein the geometric function comprises:
   a gradient geometric function configured to generate gradients that continuously animate; and wherein the tangible, non-transitory, computer-readable medium comprises computer-readable instructions to:
   provide, via the GUI, one or more affordances to change a speed, angle, scale, or any combination thereof of the gradients of the dynamic motion animation.

8. The tangible, non-transitory, computer-readable medium of claim 1, wherein the geometric function comprises:
   a mountains geometric function configured to generate mountainous shapes that continuously animate; and wherein the tangible, non-transitory, computer-readable medium comprises computer-readable instructions to:

provide, via the GUI, one or more affordances to change a speed, height, number of peaks, or any combination thereof of the mountainous shapes of the dynamic motion animation.

9. The tangible, non-transitory, computer-readable medium of claim 1, comprising computer-readable instructions to:
identify that the request to insert the dynamic motion animation comprises a request to insert the dynamic motion animation as a background of the productivity application; and
in response to identifying that the request is to insert the dynamic motion animation as a background of the productivity application, assign the dynamic motion animation to a background parameter of the productivity application, a background object of the productivity application, or both to cause the dynamic motion animation to display as the background of the productivity application.

10. The tangible, non-transitory, computer-readable medium of claim 1, comprising computer-readable instructions to:
identify that the request to insert the dynamic motion animation comprises a request to insert the dynamic motion animation as an object fill of the productivity application; and
in response to identifying that the request is to insert the dynamic motion animation as the object fill of the productivity application, assign the dynamic motion animation to an object fill parameter of the productivity application, to cause the dynamic motion animation to display as the object fill of the productivity application.

11. The tangible, non-transitory, computer-readable medium of claim 1, comprising computer-readable instructions to:
receive an indication to pin the dynamic motion animation as an object fill across multiple objects; and
in response to receiving the indication to pin the dynamic motion animation as an object fill across multiple objects, cause the dynamic motion animation to displayed across the inside of the multiple objects, bounded by boundaries of the multiple objects.

12. The tangible, non-transitory, computer-readable medium of claim 1, wherein the productivity application comprises a slide presentation software application.

13. The tangible, non-transitory, computer-readable medium of claim 12, comprising computer-readable instructions to:
during a presentation mode of the slide presentation software application, transition to a slide comprising the dynamic motion animation, by:
determining whether a preceding slide comprises a preceding dynamic motion animation;
when the preceding slide does not comprise a preceding dynamic motion animation, transition to the slide comprising the dynamic motion animation, rendering the dynamic motion animation during the transition;
when the preceding slide does comprise a preceding dynamic motion animation, determine whether the preceding dynamic motion animation and the dynamic motion animation use a common geometric function and parameters;
when the preceding dynamic motion animation and the dynamic motion animation use a common geometric function and parameters, maintain rendering of the preceding dynamic motion rendering during the transition;
when the preceding dynamic motion animation and the dynamic motion animation do not use a common geometric function, parameters, or both, determine whether a transition capable geometric function and parameters are used in the dynamic motion animation;
when transition capable geometric function and parameters are used, generate and render a blend, morph, or both animation that incrementally transitions from the preceding dynamic motion animation to the dynamic motion animation; and
when transition capable geometric function or parameters are not used, generate and render a fade out of the preceding dynamic motion animation and a fade in of the dynamic motion animation.

14. The tangible, non-transitory, computer-readable medium of claim 1, comprising computer-readable instructions to:
identify rendering scalability characteristics;
determine whether the rendering scalability characteristics indicate to scale down the dynamic motion animation;
when the rendering scalability characteristics indicate to scale down the dynamic motion animation, generate and render a scaled down dynamic motion animation; and
when the rendering scalability characteristics do not indicate to scale down the dynamic motion animation, generate and render the dynamic motion animation at full scaling.

15. The tangible, non-transitory, computer-readable medium of claim 14, wherein the rendering scalability characteristics comprise an indication of screen size of an electronic device displaying the dynamic motion animation, a power source of the electronic device, processing resources of the electronic device that are available, expended processing resources of the electronic device, a thermal profile of the electronic device, an output location of dynamic motion animation, or any combination thereof.

16. The tangible, non-transitory, computer-readable medium of claim 15, wherein the rendering scalability characteristics comprise the output location, wherein when the output location comprises a video conferencing service, the rendering scalability characteristics provide an indication to scale down the dynamic motion animation.

17. The tangible, non-transitory, computer-readable medium of claim 1, comprising computer-readable instructions to:
identify mixed-capability clients collaborating in a collaborative session of the productivity application;
identify a non-capable client that is not capable of rendering the dynamic motion animation; and
in response to identifying the non-capable client, request that a capable client that is capable of rendering the dynamic motion animation transmit a representation of the dynamic motion animation to the non-capable client, enabling the non-capable client to render the representation of the dynamic motion animation.

18. A computer-implemented method, comprising:
generating and causing display of a graphical user interface (GUI) of a slide presentation application;

during runtime of the slide presentation application, receiving, via the GUI, a request to insert a first dynamic motion animation on a first slide of the slide presentation application;

in response to the request, during the runtime of the slide presentation application, identifying a geometric function from a geometric function library and one or more parameter values associated with the request;

during the runtime of the slide presentation application, generating the first dynamic motion animation by applying the one or more parameter values associated with the request to the geometric function;

providing, during the runtime of the slide presentation application, the dynamic motion animation to cause display of the dynamic motion animation within the GUI;

detecting a transition from the first slide having the first dynamic motion animation to a second slide having a second dynamic motion animation;

transitioning to the second slide by generating and presenting a transition animation from the first slide to the second slide; and presenting the first dynamic motion animation and the second dynamic motion animation during at least one or more portions of the transition animation.

19. The computer-implemented method of claim 18, wherein the request to insert the dynamic motion animation is received in response to a user selection, via the GUI, from a list of default dynamic motion animations, where each of the default dynamic motion animations in the list are associated with a particular geometric function, parameters, and parameter values.

20. A computer system, comprising:
a processor configured to execute computer-readable instructions;
a storage device, storing a software application;
the software application, comprising:
computer-readable instructions that, when executed by the processor, causes the processor to:
generate, during runtime of a slide presentation application, a first dynamic motion animation on a first slide by applying one or more parameter values to a geometric function;
provide, during the runtime of the slide presentation application, the dynamic motion animation to cause display of the dynamic motion animation; and
detect a transition from the first slide having the first dynamic motion animation to a second slide having a second dynamic motion animation;
transition to the second slide by generating and presenting a transition animation from the first slide to the second slide; and
present the first dynamic motion animation and the second dynamic motion animation during at least one or more portions of the transition animation;
a dynamic motion rendering engine configured to access a geometric function library to generate, during runtime of the slide presentation application, the first dynamic motion animation and the second dynamic motion animation to be displayed in the slide presentation application;
one or more input structures configured to enable a user to provide an input to adjust one or more of the parameters of the first dynamic motion animation and/or the second dynamic motion animation during runtime of the slide presentation application to cause a modification to the first dynamic motion animation and/or the second dynamic motion animation; and
a display, configured to present the first dynamic motion animation, the second dynamic motion animation, and the transition animation.

* * * * *